US011111931B2

(12) United States Patent
Muraoka et al.

(10) Patent No.: US 11,111,931 B2
(45) Date of Patent: Sep. 7, 2021

(54) CONTROLLER UNIT AND LIQUID-PRESSURE DRIVING SYSTEM

(71) Applicant: KAWASAKI JUKOGYO KABUSHIKI KAISHA, Kobe (JP)

(72) Inventors: Hideyasu Muraoka, Akashi (JP); Yoji Yudate, Kobe (JP); Kazuya Iwabe, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 147 days.

(21) Appl. No.: 16/318,937

(22) PCT Filed: Jul. 25, 2017

(86) PCT No.: PCT/JP2017/026891
§ 371 (c)(1),
(2) Date: Jan. 18, 2019

(87) PCT Pub. No.: WO2018/021321
PCT Pub. Date: Feb. 1, 2018

(65) Prior Publication Data
US 2019/0285093 A1  Sep. 19, 2019

(30) Foreign Application Priority Data
Jul. 26, 2016  (JP) .............................. JP2016-146432

(51) Int. Cl.
*F15B 11/04* (2006.01)
*E02F 9/22* (2006.01)
*G01C 19/06* (2006.01)

(52) U.S. Cl.
CPC ................ *F15B 11/04* (2013.01); *E02F 9/22* (2013.01); *G01C 19/065* (2013.01)

(58) Field of Classification Search
CPC ..... G01C 19/065; F15B 11/14; F15B 11/0423
USPC .......................................................... 60/448
See application file for complete search history.

(56) References Cited

U.S. PATENT DOCUMENTS 5,927,680 A * 7/1999 Bridges ................. F16F 15/073
248/638
2013/0332036 A1   12/2013 Yamamoto et al.
2017/0089033 A1 *  3/2017 Matsuyama ............ E02F 3/437

FOREIGN PATENT DOCUMENTS

| CN | 104514240 A | 4/2015 |
|----|-------------|--------|
| JP | H06-159314 A | 6/1994 |
| JP | 2012-127154 A | 7/2012 |
| JP | 2015-67993 A | 4/2015 |

(Continued)

*Primary Examiner* — Abiy Teka
*Assistant Examiner* — Daniel S Collins
(74) *Attorney, Agent, or Firm* — Oliff PLC

(57) ABSTRACT

A controller unit is included in a liquid-pressure driving system for use in a working machine configured to supply an operating liquid to an actuator to move a structural body by the actuator. The controller unit includes: a gyro sensor configured to output a signal corresponding to an operation velocity of the structural body; and a controller configured to control a flow rate of the operating liquid supplied to the actuator, based on the signal output from the gyro sensor and corresponding to the operation velocity of the structural body, wherein: the controller is attached to the structural body; and the gyro sensor is incorporated in the controller.

15 Claims, 15 Drawing Sheets

(56) References Cited

FOREIGN PATENT DOCUMENTS

JP     2016-99744 A    5/2016

\* cited by examiner

CONTROLLER UNIT AND LIQUID-PRESSURE DRIVING SYSTEM

TECHNICAL FIELD

The present invention relates to a liquid-pressure driving system configured to supply a pressure liquid to an actuator to operate the actuator, and a controller unit included in the liquid-pressure driving system.

BACKGROUND ART

In a working machine, such as a hydraulic excavator, a turning body including a boom and the like is turned by a hydraulic motor. The working machine includes a hydraulic driving system. The hydraulic driving system drives the hydraulic motor by supplying operating oil to the hydraulic motor at a flow rate corresponding to an operation amount of an operating lever operated by a driver and turns the turning body (structural body) at a turning velocity corresponding to the operation amount of the operating lever. Known as one example of such hydraulic driving system is a hydraulic driving system of PTL 1.

The hydraulic driving system of PTL 1 includes a hydraulic pump configured to eject operating oil, and the operating oil ejected from the hydraulic pump is supplied to the hydraulic motor through a control valve. The hydraulic driving system further includes a controller, and the controller adjusts the flow rate of the operating oil supplied to the hydraulic motor in accordance with a differential pressure between an inlet port and discharge port of the hydraulic motor and a rotational frequency of the hydraulic motor.

CITATION LIST

Patent Literature

PTL 1: Japanese Laid-Open Patent Application Publication No. 2012-127154

SUMMARY OF INVENTION

Technical Problem

The hydraulic driving system of PTL 1 includes an electric motor that cooperates with the hydraulic motor, and a drive controller, i.e., the controller detects the rotational frequency of the hydraulic motor based on a signal output from a rotation sensor of the electric motor. The rotation sensor of the electric motor is provided at, for example, an output shaft of the electric motor, and the controller is provided at a position away from the rotation sensor, i.e., provided in a cabin, for example. Therefore, the length of a signal wire connecting the rotation sensor and the controller increases, and the signal wire tends to be influenced by noise. On this account, it is necessary to take a measure to prevent this. In order to avoid this, it is preferable to reduce the length of the signal wire.

Since the rotation sensor is provided at the electric motor and therefore is located in the vicinity of the hydraulic motor, it is necessary to take, for example, a measure to protect the rotation sensor from the operating oil, and thus, handling of the rotation sensor is difficult. On this account, to facilitate the handling of the sensor configured to detect the rotational frequency of the hydraulic motor, i.e., the rotational frequency of the turning body, it is preferable that the sensor be provided away from the hydraulic motor, i.e., a liquid-pressure actuator.

Further, the electric motor and the hydraulic motor are arranged in the vicinity of a center of the turning body of the working machine in order to drive the turning body, i.e., the electric motor and the hydraulic motor are arranged at such a place as to be exposed to rain water and the like. Therefore, it is necessary to take a measure to protect the rotation sensor and the wire from rain water. Further, in some cases, the working machine, such as an excavator, performs work at a sloping place, a sunken place, or the like where a ground surface is not horizontal, and a vehicle body of the working machine is not always in a horizontal state during work. When the turning body is turned with the vehicle body inclined, the turn of the turning body is influenced by load torque caused by gravity of a boom and the like, and therefore, the turning body cannot be turned at a desired acceleration velocity. On this account, the turning body cannot be turned at an acceleration velocity corresponding to the operation, and operational feeling of the driver deteriorates.

A first object of the present invention is to provide a controller unit of a liquid-pressure driving system, the controller unit being configured such that a sensor configured to detect an operation velocity of an actuator, such as a turning body, can be provided away from an operating liquid; and a distance between the sensor and a controller can be shortened.

A second object of the present invention is to provide a liquid-pressure driving system capable of suppressing a case where operational feeling when moving a structural body is deteriorated by a posture of the structural body.

Solution to Problem

A controller unit of the present invention is a controller unit included in a liquid-pressure driving system for use in a working machine configured to supply an operating liquid to an actuator to move a structural body by the actuator, the controller unit including: a gyro sensor configured to output a signal corresponding to an operation velocity of the structural body; and a controller configured to control a flow rate of the operating liquid supplied to the actuator, based on the signal output from the gyro sensor and corresponding to the operation velocity of the structural body, wherein: the controller is attached to the structural body; and the gyro sensor is incorporated in the controller.

According to the present invention, since the operation velocity of the structural body can be detected by using the gyro sensor, a detector configured to detect the operation velocity of the structural body does not have to be attached to an actuator or the like. Further, for example, by attaching the controller to a position away from the operating liquid in the structural body or a position not directly exposed to rain water in the structural body, the gyro sensor can be arranged away from the operating liquid. With this, it is unnecessary to take, for example, measures to protect the gyro sensor from the operating liquid, high temperature, and rain water. In addition, since the gyro sensor is incorporated in the controller, the distance between the gyro sensor and the controller can be set to zero, and an external wire (signal wire provided outside the controller) between the gyro sensor and the controller can be omitted. As above, since it is unnecessary to take, for example, measures to protect the gyro sensor from oil, high temperature, and water, and the external wire can be omitted, cost for attaching the gyro sensor can be significantly reduced, and handling of the gyro sensor can be facilitated.

In the above invention, the controller unit may be configured such that: the structural body is a turning body; the actuator is a liquid-pressure motor configured to turn the turning body; and the gyro sensor is configured to output a signal corresponding to a turning velocity of the turning body.

According to the above configuration, the turning velocity of the turning body can be detected by the gyro sensor without attaching the gyro sensor to the turning motor.

In the above invention, the controller unit may be configured such that: the turning body includes a structure extending portion extending in a front-rear direction; the gyro sensor is a sensor configured to output signals corresponding to respective angular velocities around first to third axes; and the controller is attached to the structural body such that the first axis coincides with the front-rear direction of the turning body, and the second axis coincides with a left-right direction of the turning body.

According to the above configuration, the roll angle, pitch angle, and turning velocity of the turning body whose front-rear direction corresponds to a direction in which a boom extends can be detected based on the signals output from the gyro sensor.

A liquid-pressure driving system of the present invention includes: the above-described controller unit; a variable displacement liquid-pressure pump configured to eject the operating liquid supplied to the liquid-pressure motor, the liquid-pressure pump being capable of changing an ejection amount; and a flow rate control device configured to control the ejection amount of the liquid-pressure pump in accordance with a pump flow rate command input to the flow rate control device, wherein: the gyro sensor outputs a first signal and a second signal, the first signal being a signal corresponding to the angular velocity of the structural body around the first axis, the second signal being a signal corresponding to the angular velocity of the structural body around the third axis; and the controller calculates a command flow rate corresponding to an operation amount of an operating element, detects a roll angle of the structural body based on the first signal output from the gyro sensor, detects the rotation direction based on the second signal output from the gyro sensor, calculates a limiting value of the command flow rate in accordance with the detected roll angle and the detected rotation direction, and outputs to the flow rate control device the pump flow rate command generated by limiting the command flow rate to the limiting value or less.

According to the present invention, the roll angle and the turning direction are detected by the gyro sensor, and the flow rate of the operating liquid ejected from the liquid-pressure pump is limited in accordance with the detected roll angle and the detected turning direction. To be specific, when turning the turning body in a state where the turning body is inclined in the left-right direction, the velocity of the liquid-pressure motor can be adjusted by limiting, in accordance with the roll angle, the flow rate of the operating liquid supplied to and discharged from the liquid-pressure motor. With this, when moving the structural body, the operating liquid can be prevented from being supplied and discharged at a flow rate that is more than necessary. Further, the operational feeling can be prevented from being deteriorated by the inclination of the turning body in the left-right direction.

In the above invention, the liquid-pressure driving system may further include a direction control valve configured to switch a rotation direction of the liquid-pressure motor by switching a flow direction of the operating liquid in accordance with an operation direction in which the operating element is operated, the operating liquid being supplied from the liquid-pressure pump to the liquid-pressure motor, wherein: the direction control valve may control in accordance with the operation amount of the operating element the flow rate of the operating liquid supplied to and discharged from the liquid-pressure motor; and the controller may detect the roll angle based on the first signal output from the gyro sensor, detect a rotation velocity of the liquid-pressure motor and the rotation direction of the liquid-pressure motor based on the second signal output from the gyro sensor, and control an operation of the direction control valve such that the flow rate of the operating liquid supplied to and discharged from the liquid-pressure motor is limited in accordance with the detected roll angle, the detected rotation velocity, and the detected rotation direction.

According to the above configuration, the roll angle, the rotation velocity, and the rotation direction are detected by the gyro sensor, and in accordance with these, the direction control valve limits the flow rate of the operating liquid supplied to and discharged from the liquid-pressure motor. For example, the roll angle changes when the turning body is turned in a state where the turning body is inclined. However, the velocity of the liquid-pressure motor can be adjusted by limiting, in accordance with the roll angle, the rotation direction, and the rotation velocity, the flow rate of the operating liquid supplied to and discharged from the liquid-pressure motor. With this, when moving the turning body, the operating liquid can be prevented from being supplied and discharged at a flow rate that is more than necessary. Further, the operational feeling can be prevented from being deteriorated by the inclination of the turning body in the left-right direction.

A liquid-pressure driving system of the present invention includes: the above-described controller unit; a liquid-pressure pump configured to eject the operating liquid supplied to the liquid-pressure motor; a direction control valve configured to switch a rotation direction of the liquid-pressure motor by switching a flow direction of the operating liquid in accordance with an operation direction in which an operating element is operated, the operating liquid being supplied from the liquid-pressure pump to the liquid-pressure motor; and a relief valve configured to adjust a liquid pressure of the operating liquid supplied to the liquid-pressure motor, by releasing the operating liquid at a set pressure corresponding to a torque command input to the relief valve, wherein: the gyro sensor outputs a first signal and a second signal, the first signal being a signal corresponding to the angular velocity of the structural body around the first axis, the second signal being a signal corresponding to the angular velocity of the structural body around the third axis; and the controller detects a roll angle of the structural body based on the first signal output from the gyro sensor, detects the rotation direction based on the second signal output from the gyro sensor, and adjusts the set pressure of the relief valve by outputting to the relief valve the torque command corresponding to the detected roll angle and the detected rotation direction.

According to the present invention, the roll angle and the turning direction are detected by the gyro sensor, and the set pressure of the relief valve is changed in accordance with the detected roll angle and the detected turning direction. With this, when rotating the turning body in a state where the turning body is inclined in the left-right direction, the torque of the liquid-pressure motor can be adjusted by changing the set pressure in accordance with the roll angle. With this, the operational feeling when moving the structural body can be prevented from being deteriorated by the inclination of the turning body in the left-right direction.

In the above invention, the liquid-pressure driving system may be configured such that: in accordance with an operation amount of the operating element, the direction control valve controls the flow rate of the operating liquid supplied to and discharged from the liquid-pressure motor; and the controller detects the roll angle based on the first signal output from the gyro sensor, detects a rotation velocity of the liquid-pressure motor and the rotation direction of the liquid-pressure motor based on the second signal output from the gyro sensor, and controls an operation of the direction control valve such that the flow rate of the operating liquid supplied to and discharged from the liquid-pressure motor is limited in accordance with the detected roll angle, the detected rotation velocity, and the detected rotation direction.

According to the above configuration, the roll angle, the rotation velocity, and the rotation direction are detected by the gyro sensor, and in accordance with these, the direction control valve limits the flow rate of the operating liquid supplied to and discharged from the liquid-pressure motor. For example, the roll angle changes when the turning body is turned in a state where the turning body is inclined. However, the velocity of the liquid-pressure motor can be adjusted by limiting, in accordance with the roll angle, the rotation direction, and the rotation velocity, the flow rate of the operating liquid supplied to and discharged from the liquid-pressure motor. With this, when moving the turning body, the operating liquid can be prevented from being supplied and discharged at a flow rate that is more than necessary. Further, the operational feeling can be prevented from being deteriorated by the inclination of the turning body in the left-right direction.

A liquid-pressure driving system of the present invention is a liquid-pressure driving system configured to supply and discharge an operating liquid to and from a liquid-pressure motor of a working machine, the liquid-pressure motor being configured to operate at a rotational frequency corresponding to a flow rate of the operating liquid supplied to and discharged from the liquid-pressure motor, the liquid-pressure driving system including: a liquid-pressure pump configured to eject the operating liquid supplied to the liquid-pressure motor; a direction control valve configured to switch a rotation direction of the liquid-pressure motor by switching a flow direction of the operating liquid, supplied to and discharged from the liquid-pressure motor, in accordance with an operation direction in which an operating element is operated, and further configured to control the flow rate of the operating liquid supplied and discharged, in accordance with an operation amount of the operating element; a posture detector configured to output a signal corresponding to a posture of a structural body of the working machine; a rotation velocity detector configured to output a signal corresponding to a rotation direction and rotation velocity of the liquid-pressure motor; and a controller configured to detect the rotation velocity of the liquid-pressure motor based on the signal output from the rotation velocity detector, and further configured to control an operation of the direction control valve such that the flow rate of the operating liquid supplied to and discharged from the liquid-pressure motor is limited to not more than an upper limit value corresponding to the rotation velocity, wherein the controller detects the posture of the structural body based on the signal output from the posture detector, detects the rotation direction and rotation velocity of the liquid-pressure motor based on the signal output from the rotation velocity detector, and corrects the upper limit value based on the detected posture and the detected rotation direction.

According to the present invention, the flow rate of the operating liquid supplied to and discharged from the liquid-pressure motor can be limited by the direction control valve in accordance with the posture of the structural body and the rotation direction. With this, the flow rate of the operating liquid can be adjusted in accordance with the posture of the structural body, and therefore, the rotation velocity of the liquid-pressure motor can be adjusted. To be specific, when moving the structural body, the operating liquid can be prevented from being supplied at a flow rate that is more than necessary. Further, the operational feeling can be prevented from being deteriorated by the posture of the structural body.

In the above invention, the liquid-pressure driving system may further include a relief valve configured to adjust a pressure difference between the operating liquid supplied to the liquid-pressure motor and the operating liquid discharged from the liquid-pressure motor, by releasing the operating liquid, supplied to and discharged from the liquid-pressure motor, at a set pressure corresponding to a torque command input to the relief valve, wherein: the controller may detect whether or not a detected inlet pressure of the turning motor has reached a predetermined set pressure; when the inlet pressure of the turning motor has not reached the set pressure, the controller may correct the upper limit value based on the detected posture and the detected rotation direction; and when the inlet pressure of the turning motor has reached the set pressure, the controller may adjust the pressure difference by outputting to the relief valve the torque command corresponding to the detected posture and the detected rotation direction.

According to the above configuration, in a state where the inlet pressure of the turning motor has not reached the set pressure, i.e., in a slow-acceleration turning operation, a slow-deceleration turning operation, or a constant-velocity turning operation, by adjusting the rotation velocity of the liquid-pressure motor by the direction control valve, the velocity can be prevented from becoming excessive or insufficient. With this, in the upward-turning operation and the downward-turning operation, the operational feeling can be prevented from being deteriorated. In a state where the inlet pressure of the turning motor has reached the set pressure, i.e., in a quick-acceleration turning operation or a quick-deceleration turning operation, the pressure difference between the operating oil supplied to the liquid-pressure motor and the operating oil discharged from the liquid-pressure motor can be adjusted by the relief valve in accordance with the posture of the structural body and the rotation direction of the liquid-pressure motor. With this, the torque of the liquid-pressure motor can be adjusted by adjusting the pressure difference between the supplied operating oil and the discharged operating oil in accordance with the posture of the structural body, and the excessive acceleration, the insufficient acceleration, the excessive deceleration, and the insufficient deceleration can be prevented. Therefore, in the upward-turning operation and the downward-turning operation, the operational feeling can be prevented from being deteriorated.

In the above invention, the liquid-pressure driving system may be configured such that: the working machine is a turning working machine including a turning body that is the structural body; the liquid-pressure motor is a turning motor configured to turn the turning body; the turning body is provided with a turning body structural portion whose load torque applied to the turning motor changes in accordance with a posture of the turning body; the posture detector outputs a signal corresponding to a roll angle indicating the posture of the turning body; the rotation velocity detector outputs a signal corresponding to a turning direction of the turning body, the turning direction corresponding to a rotation direction of the turning motor; the controller detects based on the detected roll angle and the detected turning direction whether an operation of the turning motor is an upward-turning operation in which the turning body structural portion moves upward or a downward-turning operation in which the turning body structural portion moves downward; and when the detected operation is the downward-turning operation, the controller corrects the upper limit value of the flow rate of the operating liquid supplied to and discharged from the turning motor such that the upper limit value becomes small.

According to the above configuration, at the time of the downward-turning in which the turning body is accelerated by the load torque of the turning body structural portion of the structural body, the velocity of the turning motor can be suppressed by correcting the upper limit value of the flow rate of the operating liquid supplied to and discharged from the turning motor such that the upper limit value becomes small. With this, the turning body can be prevented from being accelerated and increased in velocity at the time of the downward-turning. Further, the operational feeling when moving the structural body can be prevented from being deteriorated by the posture of the structural body.

In the above invention, the liquid-pressure driving system may further include a working machine actuator different from the turning motor, wherein: the working machine actuator may operate by the operating oil ejected from the liquid-pressure pump; and when the detected turning operation is the upward-turning operation, the controller may correct the upper limit value of the flow rate of the operating liquid supplied to and discharged from the turning motor such that the upper limit value becomes small.

According to the above configuration, when decelerating the turning body by the load torque of the turning body structural portion of the structural body at the time of the upward-turning, the operating liquid can be preferentially supplied to the working machine actuator by reducing the upper limit value of the flow rate of the operating liquid supplied to and discharged from the turning motor. With this, without changing the velocity of the turning body at the time of the upward-turning, the flow rate of the operating liquid supplied to the working machine actuator can be increased. Thus, work efficiency when moving the working machine actuator while moving the turning body structural portion can be improved.

In the above invention, the liquid-pressure driving system may be configured such that: the posture detector outputs a signal corresponding to a pitch angle indicating the posture of the turning body; and when the detected operation is the downward-turning operation, the controller calculates based on the roll angle the flow rate of the operating liquid supplied to and discharged from the turning motor and corrects in accordance with the detected pitch angle the flow rate of the operating liquid supplied to and discharged from the turning motor.

According to the above configuration, the operational feeling when moving the structural body can be prevented from being deteriorated by the pitch angle of the turning body.

A liquid-pressure driving system of the present invention is a liquid-pressure driving system configured to supply and discharge an operating liquid to and from a liquid-pressure motor configured to move a structural body of a working machine by operating with torque corresponding to a pressure difference between the operating liquid supplied to the liquid-pressure motor and the operating liquid discharged from the liquid-pressure motor, the liquid-pressure driving system including: a liquid-pressure pump configured to eject the operating liquid supplied to the liquid-pressure motor; a direction switching valve configured to switch a rotation direction of the liquid-pressure motor by switching a flow direction of the operating liquid in accordance with an operation direction in which an operating element is operated, the operating liquid being supplied from the liquid-pressure pump to the liquid-pressure motor; a relief valve configured to adjust a pressure difference between the operating liquid supplied to the liquid-pressure motor and the operating liquid discharged from the liquid-pressure motor, by releasing the operating liquid, supplied to and discharged from the liquid-pressure motor, at a set pressure corresponding to a torque command input to the relief valve; a posture detector configured to output a signal corresponding to a posture of the structural body; a rotation direction detector configured to output a signal corresponding to the rotation direction; and a controller configured to detect the posture based on the signal output from the posture detector, detect the rotation direction based on the signal output from the rotation direction detector, and adjust the pressure difference by outputting to the relief valve the torque command corresponding to the detected posture and the detected rotation direction.

According to the present invention, the pressure difference between the operating oil supplied to the liquid-pressure motor and the operating oil discharged from the liquid-pressure motor can be adjusted by the relief valve in accordance with the posture of the structural body and the rotation direction of the liquid-pressure motor. Therefore, the torque of the liquid-pressure motor can be adjusted by adjusting the pressure difference between the supplied operating oil and the discharged operating oil in accordance with the posture of the structural body. With this, the operational feeling when moving the structural body can be prevented from being deteriorated by the posture of the structural body.

In the above invention, the liquid-pressure driving system may be configured such that: the working machine is a turning working machine including a turning body that is the structural body; the liquid-pressure motor is a turning motor configured to turn the turning body; the turning body is provided with a turning body structural portion whose load torque applied to the turning motor changes in accordance with a posture of the turning body; the posture detector outputs a signal corresponding to a roll angle of the turning body, the roll angle indicating the posture of the turning body; the rotation direction detector outputs a signal corresponding to a turning direction of the turning body and a rotation velocity of the liquid-pressure motor, the turning direction corresponding to the rotation direction; the controller detects based on the detected roll angle and the detected turning direction whether an operation of the turning motor is an upward-turning operation in which the turning body structural portion moves upward or a downward-turning operation in which the turning body structural portion moves downward; the controller detects based on the signal output from the rotation velocity detector whether a state of the turning body is an acceleration state or a deceleration state; when the detected operation is the upward-turning operation, and the detected state is the acceleration state, the controller adjusts the pressure difference such that turn torque of the turning motor becomes larger than that when the turning operation is performed on a flat land, and the state of the turning body is the acceleration state; and when the detected operation is the downward-turning operation, and the detected state is the acceleration state, the controller adjusts the pressure difference such that the turn torque of the turning motor becomes smaller that when the turning operation is performed on a flat land, and the state of the turning body is the acceleration state.

According to the above configuration, when the turning body is performing the upward-turning in which the turning body is decelerated by the load torque of the turning body structural portion of the structural body, and the turning body is accelerating, the turn torque of the turning motor can be increased. With this, when the turning body is performing the upward-turning and accelerating, the torque for rotating the turning body can be prevented from becoming insufficient. Further, when the turning body is performing the downward-turning and accelerating, the torque for rotating the turning body can be prevented from becoming excessive. The operational feeling when moving the structural body can be prevented from being deteriorated by the posture of the structural body.

In the above invention, the liquid-pressure driving system may be configured such that: the working machine is a turning working machine including a turning body that is the structural body; the liquid-pressure motor is a turning motor configured to turn the turning body; the turning body is provided with a turning body structural portion whose load torque applied to the turning motor changes in accordance with a posture of the turning body; the posture detector outputs a signal corresponding to a roll angle of the turning body, the roll angle indicating the posture of the turning body; the rotation direction detector outputs a signal corresponding to a turning direction of the turning body and a rotation velocity of the liquid-pressure motor, the turning direction corresponding to the rotation direction; the controller detects based on the detected roll angle and the detected turning direction whether an operation of the turning motor is an upward-turning operation in which the turning body structural portion moves upward or a downward-turning operation in which the turning body structural portion moves downward; the controller detects based on the signal output from the rotation direction detector whether a state of the turning body is an acceleration state or a deceleration state; when the detected operation is the upward-turning operation, and the detected state is the deceleration state, the controller adjusts the pressure difference such that brake torque of the turning motor becomes smaller than that when the turning operation is performed on a flat land, and the state of the tuning body is the deceleration state; and when the detected operation is the downward-turning operation, and the detected state is the deceleration state, the controller adjusts the pressure difference such that the brake torque of the turning motor becomes larger than that when the turning operation is performed on a flat land, and the state of the tuning body is the deceleration state.

According to the above configuration, when the turning body is performing the upward-turning in which the turning body is decelerated by the load torque of the turning body structural portion of the structural body, and the turning body is decelerating, the brake torque of the turning motor can be decreased. Further, when the turning body is performing the downward-turning in which the turning body is accelerated by the load torque of the turning body structural portion of the structural body, and the turning body is decelerating, the brake torque of the turning motor can be increased. With this, when the turning body is performing the upward-turning and decelerating, the brake torque for rotating the turning body can be prevented from becoming excessive. Further, when the turning body is performing the downward-turning and decelerating, the brake torque for rotating the turning body can be prevented from becoming insufficient. Thus, the operational feeling when moving the structural body can be prevented from being deteriorated by the posture of the structural body.

In the above invention, the liquid-pressure driving system may be configured such that: the posture detector outputs a signal corresponding to a pitch angle indicating the posture of the turning body; and when the detected operation is the upward-turning operation, the controller corrects the pressure difference in accordance with the detected pitch angle.

According to the above configuration, the operational feeling when moving the structural body can be prevented from being deteriorated by the pitch angle of the turning body.

In the above invention, the liquid-pressure driving system may further include a gyro sensor including the posture detector and the rotation direction detector, wherein the gyro sensor may output signals corresponding to the roll angle of the turning body, the pitch angle of the turning body, and a turning velocity of the turning body, respectively.

According to the above configuration, since the roll angle, pitch angle, and turning velocity of the turning body can be detected by the gyro sensor, the number of parts can be reduced.

Advantageous Effects of Invention

According to the present invention, a sensor configured to detect an operation velocity of an actuator, such as a turning body, can be provided away from an operating liquid, and a distance between the sensor and a controller can be made short.

Further, according to the present invention, operational feeling when moving a structural body can be prevented from being deteriorated by a posture of the structural body.

The above object, other objects, features, and advantages of the present invention will be made clear by the following detailed explanation of preferred embodiments with reference to the attached drawings.

DESCRIPTION OF EMBODIMENTS

Hereinafter, hydraulic driving systems 1 and 1A to 1C and controller units 2 and 2A to 2C according to embodiments of the present invention will be mainly explained with reference to the drawings. It should be noted that directions stated in the following explanation coincide with directions from the viewpoint of a driver and are used for convenience sake. Therefore, the directions stated below do not limit directions and the like of components of the present invention. Further, each of the hydraulic driving systems 1 and 1A to 1C and the controller units 2 and 2A to 2C is just one embodiment of the present invention. Therefore, the present invention is not limited to the embodiments, and additions, deletions, and modifications may be made within the scope of the present invention.

Embodiment 1

Hydraulic Excavator

Figure 1:
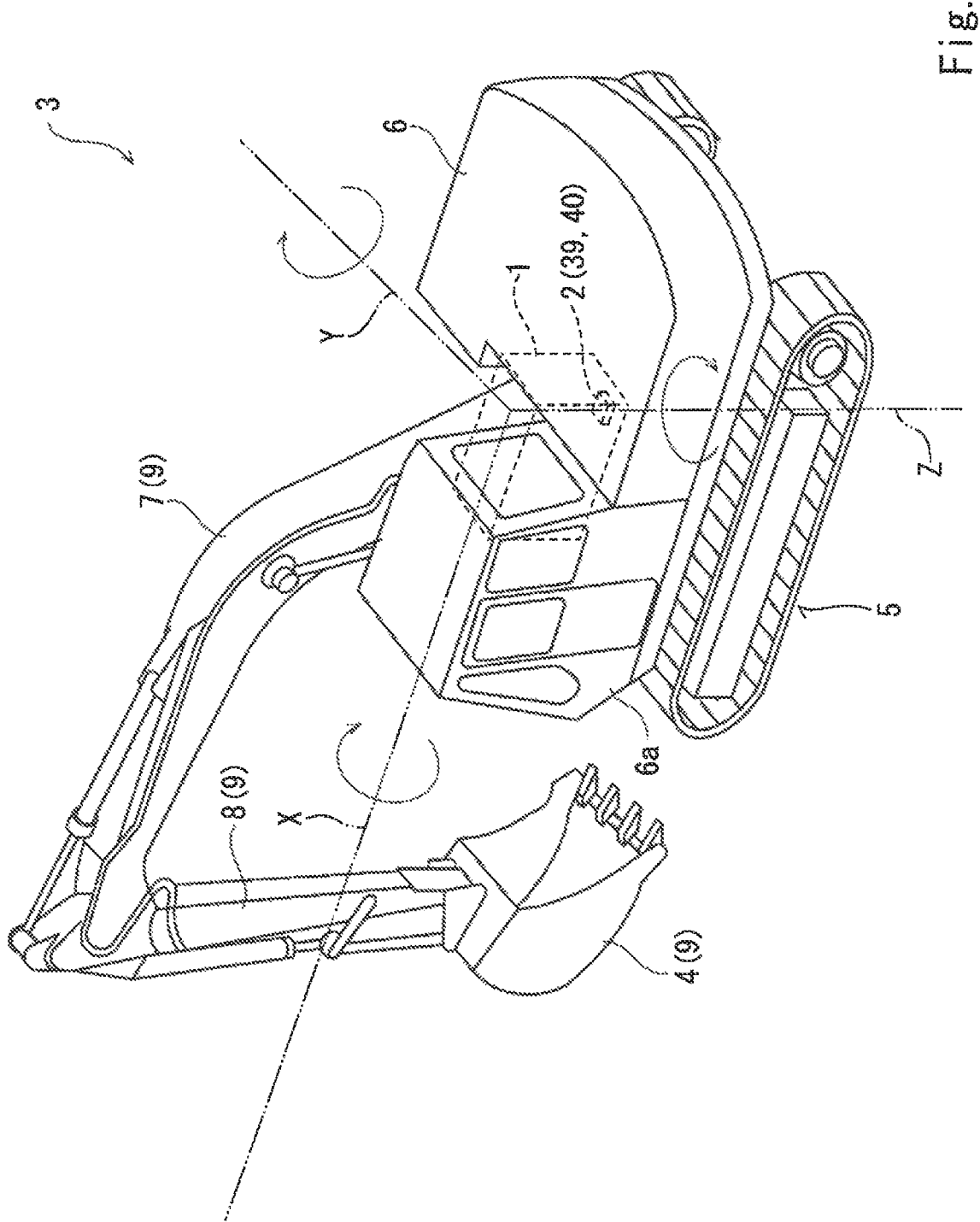
FIG. 1 is a perspective view showing a hydraulic excavator including a hydraulic driving system according to Embodiment 1 of the present invention when viewed from an obliquely rear direction.

As shown in FIG. 1, a hydraulic excavator 3 that is a working machine can perform various work, such as excavating work and carrying work, by an attachment, such as a bucket 4, attached to a tip end portion of the hydraulic excavator 3. The hydraulic excavator 3 includes a traveling device 5, such as a crawler, and a turning body 6 is mounted on the traveling device 5. A driver's seat 6a (cabin) on which a driver gets is formed at the turning body 6 that is one of structural bodies. The bucket 4 is provided at the turning body 6 through a boom 7 and an arm 8. The boom 7, the arm 8, and the bucket 4 constitute a structure extending portion 9 extending in a front-rear direction. The structure extending portion 9 is such a component that when the turning body 6 is turned on a slope way, the turn of the turning body 6 is influenced by gravitational load of the structure extending portion 9. The turning body 6 configured as above is turnable relative to the traveling device 5. The hydraulic excavator 3 includes a hydraulic driving system 1 configured to move the traveling device 5, the boom 7, the arm 8, and the bucket 4 and turn the turning body 6. Hereinafter, the configuration of the hydraulic driving system 1 of Embodiment 1 will be explained with reference to FIGS. 2 and 3.

Hydraulic Driving System

The hydraulic driving system 1 that is a liquid-pressure driving system mainly includes two hydraulic pumps 10 and 110, a plurality of control valves 11 and 111 to 117, and a plurality of working machine actuators 17 and 121 to 125. The hydraulic pumps 10 and 110 that are liquid-pressure pumps are variable displacement swash plate hydraulic pumps and are driven by an engine E to eject operating oil (operating liquid). The hydraulic pump 10 includes a swash plate 10a and can change an ejection amount of the operating oil by tilting the swash plate 10a, and the hydraulic pump 110a includes a swash plate 110a and can change an ejection amount of the operating oil by tilting the swash plate 110a. A regulator 18 is provided at the swash plate 10a, and a regulator 118 is provided at the swash plate 110a. It should be noted that since the regulators 18 and 118 are similar in configuration to each other, the following will explain the configuration of the regulator 18 with reference to FIG. 3, and an explanation of the configuration of the regulator 118 is omitted.

The regulator 18 includes a servo piston (not shown). The servo piston is coupled to the swash plate 10a, and the swash plate 10a tilts at a tilting angle corresponding to a position of the servo piston. The regulator 18 is connected to a pilot pump 20 through an electromagnetic proportional pressure reducing valve 19. The electromagnetic proportional pressure reducing valve 19 is configured to reduce hydraulic pressure, ejected from the pilot pump 20, to a command pressure $p_0$ corresponding to a pump tilt command input to the electromagnetic proportional pressure reducing valve 19. The command pressure $p_0$ is applied to the regulator 18, and the servo piston moves to a position corresponding to the command pressure $p_0$. To be specific, the swash plate 10a tilts at the tilting angle corresponding to the pump tilt command input to the electromagnetic proportional pressure reducing valve 19.

Figure 2:
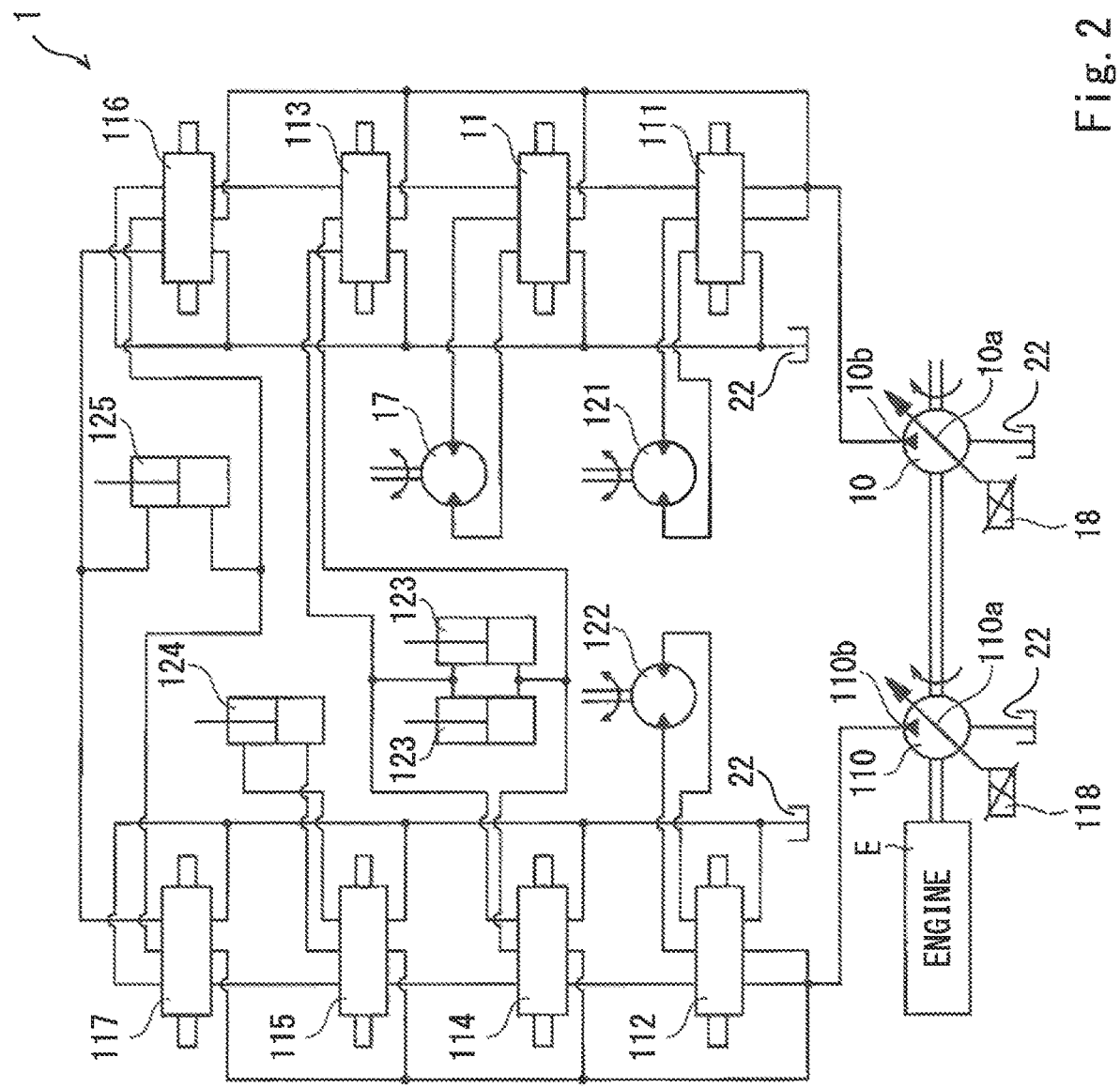
FIG. 2 is a circuit diagram showing an entire hydraulic circuit of the hydraulic driving system of Embodiment 1 included in the hydraulic excavator of FIG. 1.
Figure 3:
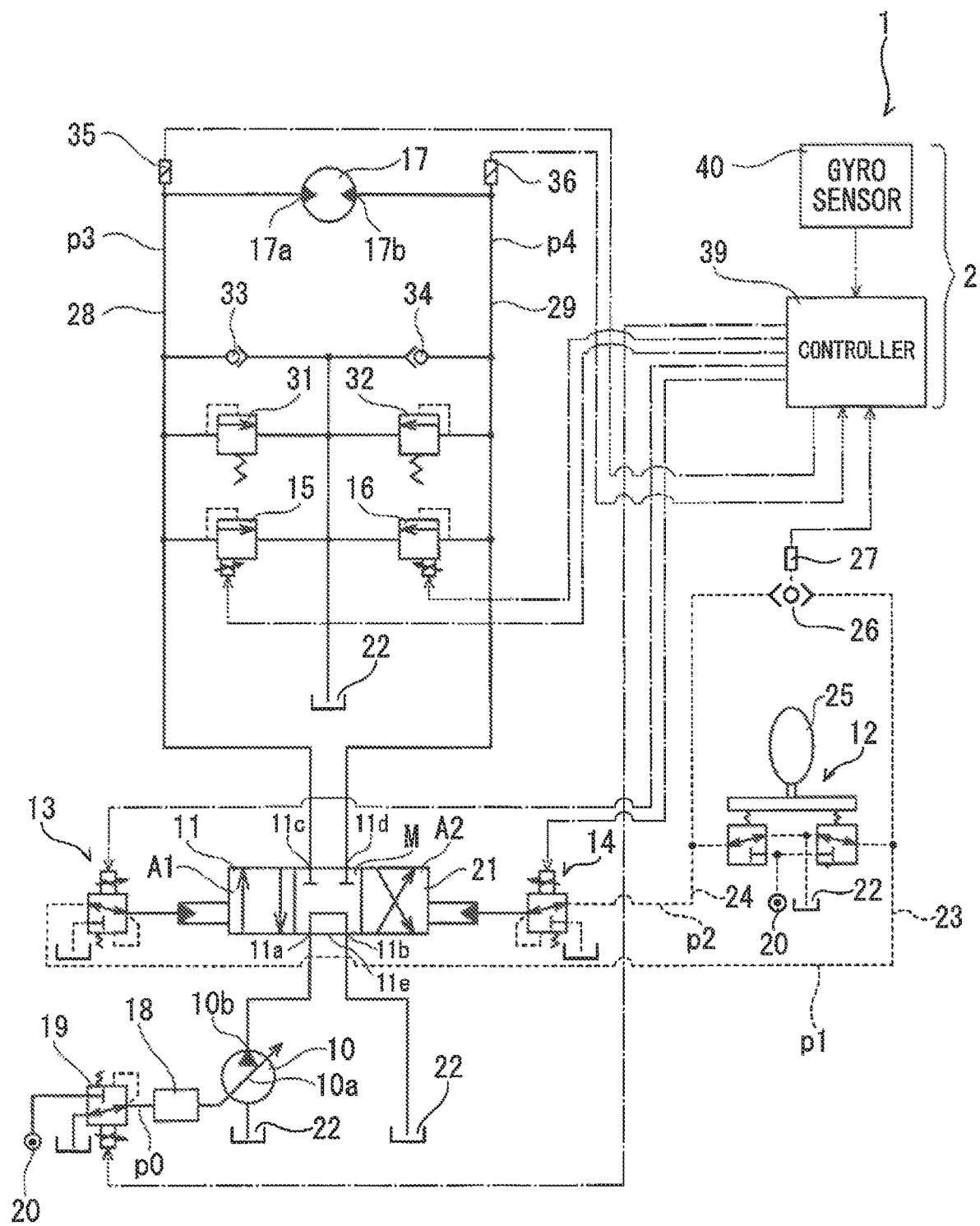
FIG. 3 is a circuit diagram showing a part of the hydraulic circuit of the hydraulic driving system of FIG. 2.

The hydraulic pump 10, 110 configured as above ejects the operating oil from an outlet port 10b, 110b at a flow rate corresponding to the tilting angle. As shown in FIG. 2, the plurality of control valves 11 and 111 to 117 are connected to the outlet ports 10b and 110b. To be specific, a first traveling control valve 111, a turning control valve 11, a first boom control valve 113, and a first arm control valve 116 are connected to the outlet port 10b of the hydraulic pump 10 in this order from an upstream side. Further, a second traveling control valve 112, a second boom control valve 114, a bucket control valve 115, and a second arm control valve 117 are connected to the outlet port 110b of the hydraulic pump 110 in this order from an upstream side.

The plurality of control valves 11 and 111 to 117 are connected to the corresponding working machine actuators 17 and 121 to 125. To be specific, the first traveling control valve 111 is connected to a right traveling motor 121 included in the traveling device 5, and the second traveling control valve 112 is connected to a left traveling motor 122 included in the traveling device 5. The first and second boom control valves 113 and 114 are connected to boom actuators 123. The bucket control valve 115 is connected to a bucket actuator 124. The first and second arm control valves 116 and 117 are connected to an arm actuator 125.

Each of the control valves 11 and 111 to 117 is a normally closed spool valve and is configured such that a spool (not shown except for a spool 21 (see FIG. 3) of the control valve 11) thereof moves to a position corresponding to a command from a remote control valve (not shown except for a remote control valve 12 (see FIG. 3) of the control valve 11). By the movement of the spool, the operating oil is supplied to and discharged from the corresponding working machine actuator (17 and 121 to 125) at a flow rate corresponding to the position of the spool.

In the hydraulic driving system 1 configured as above, the control valve (11 and 111 to 117) operates in accordance with a command from the remote control valve, and the operating oil is supplied to and discharged from the working machine actuator (17 and 121 to 125) corresponding to the operating control valve (11 and 111 to 117). With this, the working machine actuators 17 and 121 to 125 operate, and the traveling device 5, the turning body 6, the boom 7, the bucket 4, and the arm 8 move. Hereinafter, components for turning the turning body 6 will be explained in more detail with reference to FIG. 3.

The turning control valve 11 (hereinafter referred to as the "control valve 11") includes the spool 21 and can move the spool 21 to switch a flow direction of the operating oil ejected from the hydraulic pump 10 and also change the flow rate of the operating oil. More specifically, the control valve 11 includes four ports 11a to 11d. A first port 11a is connected to the hydraulic pump 10, and a second port 11b is connected to a tank 22. Third and fourth ports 11c and 11d are connected to a turning motor 17. A destination to which each of the ports 11a to 11d is connected changes by the movement of the spool 21. For example, when the spool 21 is located at a neutral position M, the first port 11a and the second port 11b are connected to each other, and the hydraulic pump 10 becomes an unloaded state, and the third port 11c and the fourth port 11d are blocked. When the spool 21 moves to a first offset position A1, the first port 11a and the third port 11c are connected to each other, and the second port 11b and the fourth port 11d are connected to each other. On the other hand, when the spool 21 moves to a second offset position A2, the first port 11a and the fourth port 11d are connected to each other, and the second port 11b and the third port 11c are connected to each other.

As above, the control valve 11 can move the spool 21 to switch connection states of the ports 11a to 11d, and with this, can switch the flow of the operating oil ejected from the hydraulic pump 10. Further, when the control valve 11 moves the spool 21 to change the position of the spool 21, opening degrees of the ports 11a to 11d are changed. By changing the opening degrees, the flow rate of the operating oil flowing to the turning motor 17 through the control valve 11 is changed. In order to move the spool 21, the remote control valve 12 is connected to the control valve 11 through two pilot passages 23 and 24.

The remote control valve 12 is an input device for inputting a turn command. The remote control valve 12 includes an operating lever 25. The operating lever 25 that is an operating element is configured to be tiltable toward one side and the other side in a predetermined direction. The remote control valve 12 outputs pilot oil having pressure corresponding to the tilt amount (operation amount) of the operating lever 25, to the pilot passage 23 or 24 corresponding to a tilt direction of the operating lever 25. The output pilot oil is introduced to the spool 21 through the pilot passage 23 or 24. The spool 21 receives pilot pressures p1 and p2, each of which is the pressure of the pilot oil, in directions opposing each other and moves to a position corresponding to the pilot pressures p1 and p2. This changes the flow direction and flow rate of the operating oil ejected from the hydraulic pump 10.

The pilot passages 23 and 24 are connected to a shuttle valve 26, and the shuttle valve 26 is connected to a pilot pressure sensor 27. The shuttle valve 26 selects a higher one of the pilot pressures p1 and p2, and the pilot pressure sensor 27 detects the pressure selected by the shuttle valve 26. To be specific, the pilot pressure sensor 27 outputs a pilot signal corresponding to the pilot pressure p1, p2 output from the remote control valve 12.

An electromagnetic proportional pressure reducing valve 13 is interposed on the pilot passage 23, and an electromagnetic proportional pressure reducing valve 14 is interposed on the pilot passage 24. Each of the electromagnetic proportional pressure reducing valves 13 and 14 reduces the pilot pressure p1, p2, output from the remote control valve 12 to the control valve 11, to pressure corresponding to a current (command value) flowing through the electromagnetic proportional pressure reducing valve 13, 14. By this pressure reduction, the flow rate of the operating oil flowing from the first port 11a to the third port 11c or the fourth port 11d can be made lower than the flow rate corresponding to the tilt amount of the operating lever 25, and therefore, the flow rate of the operating oil flowing to the turning motor 17 connected to the third port 11c or the fourth port 11d can be limited.

The turning motor 17 is a so-called fixed displacement swash plate hydraulic motor and rotates to turn the turning body 6. The turning motor 17 includes two supply/discharge ports 17a and 17b. When the operating oil is supplied to a first supply/discharge port 17a, the turning motor 17 rotates an output shaft thereof in a forward direction at a rotation velocity corresponding to the flow rate of the operating oil to turn the turning body 6 toward a first side in a predetermined direction. On the other hand, when the operating oil is supplied to a second supply/discharge port 17b, the turning motor 17 rotates the output shaft in a reverse direction at a rotation velocity corresponding to the flow rate of the operating oil to turn the turning body 6 toward a second side in the predetermined direction. The third port 11c of the control valve 11 is connected to the first supply/discharge port 17a through a first oil passage 28, and the fourth port 11d of the control valve 11 is connected to the second supply/discharge port 17b through a second oil passage 29. A rotation direction of the turning motor 17 can be switched by switching the direction of the operating oil flowing from the hydraulic pump 10 by the control valve 11. The turning motor 17 rotates the output shaft by torque corresponding to a pressure difference between the two supply/discharge ports 17a and 17b, i.e., a supply/discharge differential pressure. In order to adjust the supply/discharge differential pressure of the supply/discharge ports 17a and 17b, an electromagnetic relief valve 15 is connected to the first oil passage 28, and an electromagnetic relief valve 16 is connected to the second oil passage 29.

The electromagnetic relief valve 15 has a pressure adjusting function of discharging the operating oil of the first oil passage 28 to the tank 22 to adjust the hydraulic pressure of the operating oil to a pressure (i.e., a set pressure) corresponding to a current (pressure command) flowing through the electromagnetic relief valve 15, and the electromagnetic relief valve 16 has a pressure adjusting function of discharging the operating oil of the second oil passage 29 to the tank 22 to adjust the hydraulic pressure of the operating oil to a pressure (i.e., a set pressure) corresponding to a current (pressure command) flowing through the electromagnetic relief valve 16. The torque of the turning motor 17 (i.e., torque for accelerating or decelerating the turn of the turning body 6) is adjusted by adjusting the hydraulic pressure (a use set pressure) of the first oil passage 28 by the electromagnetic relief valve 15 and adjusting the hydraulic pressure (a use set pressure) of the second oil passage 29 by the electromagnetic relief valve 16. With this, the acceleration and deceleration of the turning body 6 can be adjusted.

Further, a relief valve 31 and a check valve 33 are connected to the first oil passage 28 in parallel with the electromagnetic relief valve 15, and a relief valve 32 and a check valve 34 are connected to the second oil passage 29 in parallel with the electromagnetic relief valve 16. The relief valve 31 opens the oil passage 28 to the tank 22 when the pressure of the operating oil flowing through the oil passage 28 exceeds a predetermined use set pressure, and the relief valve 32 opens the oil passage 29 to the tank 22 when the pressure of the operating oil flowing through the oil passage 29 exceeds a predetermined use set pressure. Set pressures of the relief valves 31 and 32 are set to be higher than the set pressures of the electromagnetic relief valves 15 and 16 when the relief valves 31 and 32 are used together with the electromagnetic relief valves 15 and 16. Therefore, when the electromagnetic relief valves 15 and 16 electrically fail, and the pressure of at least one of the supply/discharge ports 17a and 17b of the turning motor 17 exceeds the use set pressure, at least one of the relief valves 31 and 32 opens to release the operating oil to the tank 22. By releasing the operating oil as above, the pressures of the supply/discharge ports 17a and 17b (i.e., an inlet pressure and an outlet pressure) of the turning motor 17 are prevented from excessively increasing, and therefore, the hydraulic driving system 1 is prevented from being damaged. It should be noted that in a case where the electromagnetic relief valves 15 and 16 are configured to be able to release the operating oil even when the electromagnetic relief valves 15 and 16 electrically fail, the relief valves 31 and 32 may be omitted. The check valves 33 and 34 are connected to the tank 22. The check valve 33 allows the flow of the operating oil from the tank 22 to the oil passage 28 and blocks the flow of the operating oil in the reverse direction, and the check valve 34 allows the flow of the operating oil from the tank 22 to the oil passage 29 and blocks the flow of the operating oil in the reverse direction. With this, when the amount of operating oil for driving the turning motor 17 is insufficient, the operating oil can be introduced from the tank 22 through the check valves 33 and 34 to the turning motor 17.

Further, a hydraulic pressure sensor 35 is provided at the first oil passage 28, and a hydraulic pressure sensor 36 is provided at the second oil passage 29. The hydraulic pressure sensor 35 outputs a signal corresponding to the hydraulic pressure of the supply/discharge port 17a of the turning motor 17 (specifically, the hydraulic pressure of the first oil passage 28), and the hydraulic pressure sensor 36 outputs a signal corresponding to the hydraulic pressure of the supply/discharge port 17b of the turning motor 17 (specifically, the hydraulic pressure of the second oil passage 29). The hydraulic pressure sensors 35 and 36 are electrically connected to the controller unit 2 configured to control various components. Each of the hydraulic pressure sensors 35 and 36 transmits the signal corresponding to the hydraulic pressure to the controller unit 2 shown in FIG. 3.

The controller unit 2 includes a controller 39 and a gyro sensor 40. The controller 39 is electrically connected to the electromagnetic proportional pressure reducing valves 13 and 14, the electromagnetic relief valves 15 and 16, and the electromagnetic proportional pressure reducing valves 19 and controls the operations of the valves 13 to 16 and 19. The hydraulic driving system 1 of the present embodiment includes the two hydraulic pumps 10 and 110 and the plurality of control valves 11 and 111 to 117, and the electromagnetic proportional pressure reducing valves 19 are provided for the respective regulators 18 and 118. The electromagnetic proportional pressure reducing valves 13 and 14, the electromagnetic relief valves 15 and 16, and the electromagnetic proportional pressure reducing valves 19 are individually and electrically connected to the controller unit 2, and the controller 39 can individually control all the operations of those valves. The controller 39 controls the operations of the valves 13 to 16 and 19 based on states of the hydraulic excavator 3 and components included in the hydraulic excavator 3. In order to detect such states, the gyro sensor 40 is connected to the controller 39 in addition to the hydraulic pressure sensors 35 and 36.

Figure 4:
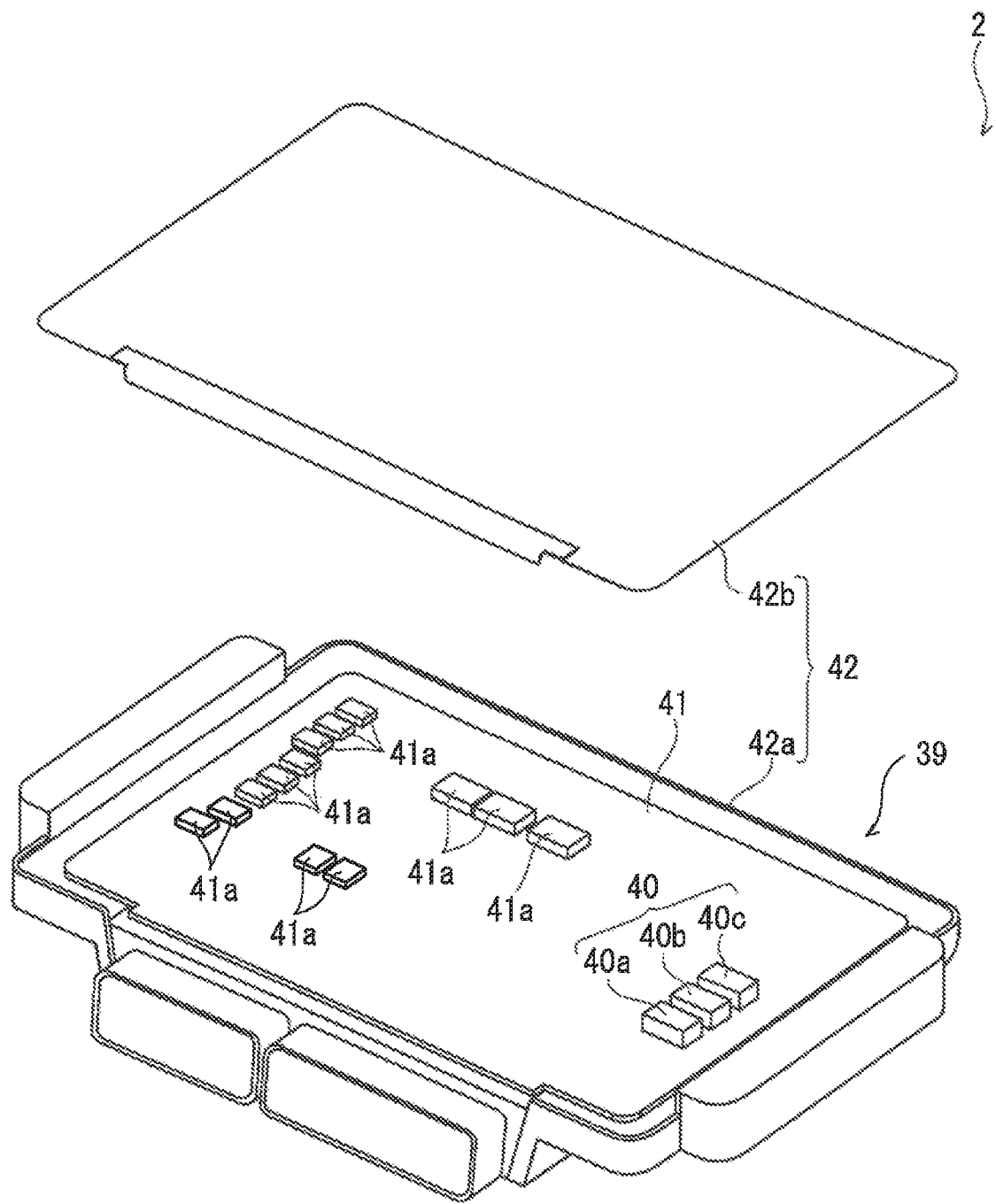
FIG. 4 is a perspective view showing a controller included in the hydraulic excavator of FIG. 1.
Figure 5:
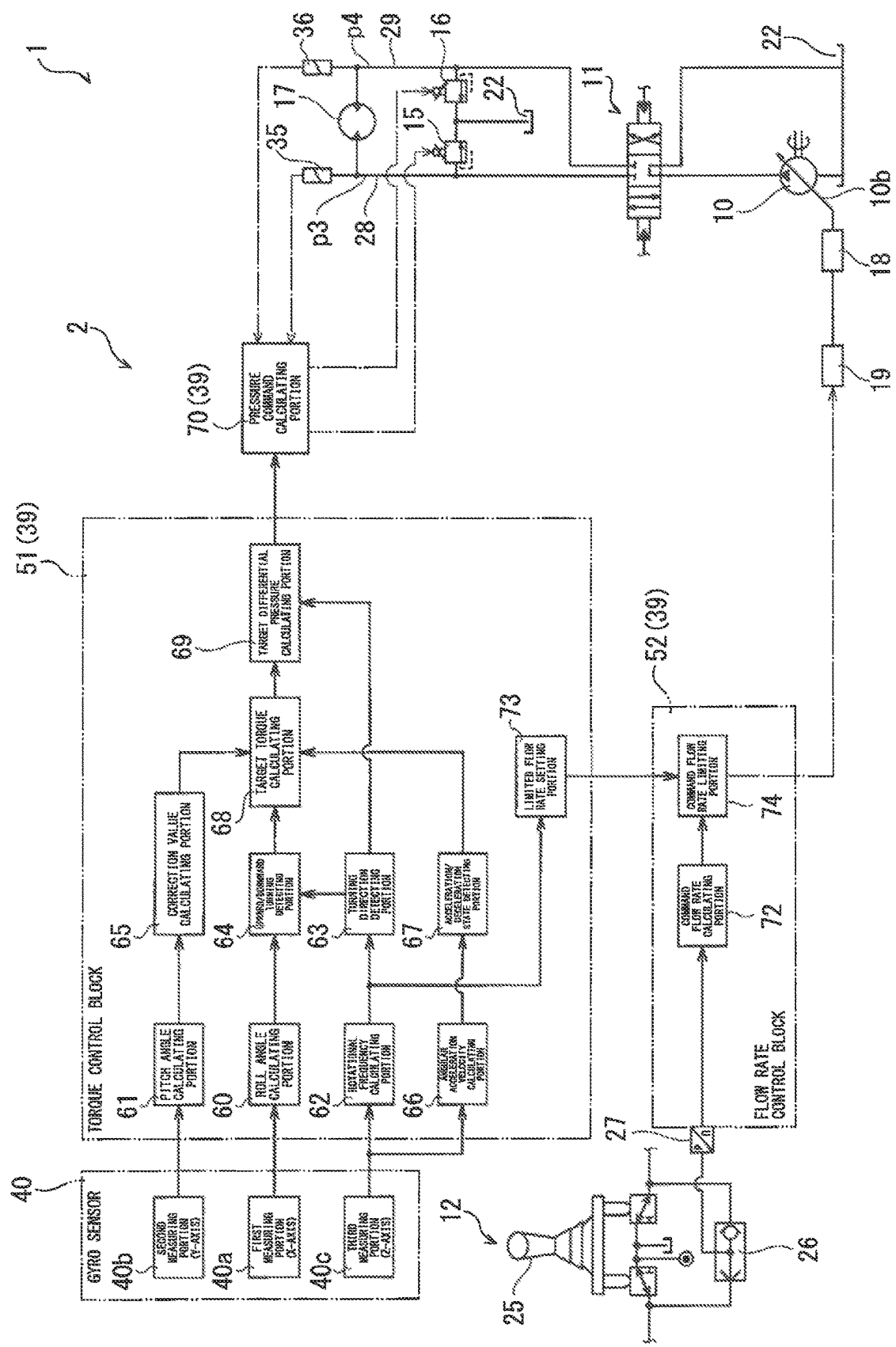
FIG. 5 is a block diagram showing control blocks constituting the controller included in the hydraulic driving system of Embodiment 1.

For example, as shown in FIG. 5, the gyro sensor 40 is a triaxial gyro sensor including three measuring portions 40a to 40c. The measuring portions 40a to 40c detect respective angular velocities (operation velocities) of the turning body 6 around first to third axes, i.e., an X-axis, a Y-axis, and a Z-axis perpendicular to one another (see FIG. 5 described below). Further, as shown in FIG. 4, the gyro sensor 40 is incorporated in the controller unit 2 in the present embodiment. With this, the gyro sensor 40 can be provided away from hydraulic devices, such as the hydraulic pump 10 and the turning motor 17, i.e., away from the operating oil, and a distance between the gyro sensor 40 and the controller 39 can be made short. Further, by incorporating the gyro sensor 40 in the controller 39, an external wire (signal wire arranged outside the controller 39) connecting the gyro sensor 40 and the controller 39 can be omitted. As above, the controller unit 2 is configured by incorporating the controller 39 in the gyro sensor 40.

More specifically, the controller 39 of the controller unit 2 is constituted by a substrate 41 and a casing 42. The controller unit 2 is configured such that: a plurality of circuit elements 41a are mounted on the substrate 41; and the gyro sensor 40 is further mounted on a vacant region of the substrate 41. The substrate 41 on which the gyro sensor 40 is mounted as above is fixed to a main body portion 42a of the casing 42 and is sealed in the casing 42 by closing an opening portion of the main body portion 42a with a lid body 42b. Thus, the gyro sensor 40 is incorporated in the controller 39 so as not to be exposed to dust, dirt, the operating oil, and the like.

Further, the controller unit 2 is attached to the turning body 6 such that: the X-axis of the gyro sensor 40 coincides with a direction (i.e., the front-rear direction) in which the structure extending portion 9 extends; and the Z-axis of the gyro sensor 40 coincides with a turning axis of the turning body 6. It should be noted that the Y-axis coincides with a left-right direction. The gyro sensor 40 arranged as above outputs angular velocity signals corresponding to the angular velocities (or angular acceleration velocities) around the respective axes to the controller 39. Based on the angular velocity signals from the gyro sensor 40, the controller 39 calculates the state of the turning body 6 and the posture of the turning body 6.

More specifically, the angle around the X-axis, the angle around the Y-axis, and the angle around the Z-axis correspond to a left-right inclination (i.e., the roll angle) of the hydraulic excavator 3, a front-rear inclination (i.e., the pitch angle) of the hydraulic excavator 3, and a turning angle of the turning body 6, respectively. The controller 39 detects the roll angle of the hydraulic excavator 3 based on an X-axis angular velocity signal (first signal) that is the angular velocity signal regarding the angular velocity around the X-axis, detects the pitch angle of the hydraulic excavator 3 based on a Y-axis angular velocity signal that is the angular velocity signal regarding the angular velocity around the Y-axis, and detects the rotational frequency (i.e., the turning velocity) of the turning body 6 based on a Z-axis angular velocity signal (second signal) that is the angular velocity signal regarding the angular velocity around the Z-axis. It should be noted that the front-rear direction and the left-right direction in the present embodiment are directions from the viewpoint of the driver. Since the turning body 6 turns, the front-rear direction may be different from a traveling direction of the hydraulic excavator 3.

As above, the controller 39 detects the rotational frequency of the turning body 6 as a state value of the turning body 6 and also detects the roll angle and the pitch angle as posture values of the turning body 6. The controller 39 controls the operations of the valves 13 to 16 and 19 by supplying to the valves 13 to 16 and 19 the above detected values and command values corresponding to the signals output from the pilot pressure sensor 27 and the hydraulic pressure sensors 35 and 36. With this, regardless of the posture of the turning body 6, the controller 39 can turn the turning body 6 in accordance with the movement of the operating lever 25. Hereinafter, the functions of the controller 39 will be specifically explained as control blocks with reference to FIG. 5.

The controller 39 includes a torque control block 51 and a flow rate control block 52. The torque control block 51 detects a turning state of the turning body 6 and the posture of the turning body 6 from the angular velocity signals output from the gyro sensor 40 and controls the torque of the turning motor 17 based on the turning state and posture of the turning body 6. The flow rate control block 52 controls the flow rate of the operating oil supplied to the turning motor 17, based on the turning state of the turning body 6. Hereinafter, the functions of the control blocks 51 and 52 will be explained in more detail. First, the torque control block 51 will be explained. The torque control block 51 includes a roll angle calculating portion 60, a pitch angle calculating portion 61, a rotational frequency calculating portion 62, a turning direction detecting portion 63, an upward/downward turning detecting portion 64, a correction value calculating portion 65, an angular acceleration velocity calculating portion 66, an acceleration/deceleration state detecting portion 67, a target torque calculating portion 68, a target differential pressure calculating portion 69, and a limited flow rate setting portion 73.

The roll angle calculating portion 60 detects the angular velocity (or the acceleration velocity) around the X-axis of the hydraulic excavator 3 based on the X-axis angular velocity signal output from the first measuring portion 40*a* of the gyro sensor 40 and further calculates the roll angle of the turning body 6 based on the angular velocity (or the acceleration velocity) around the X-axis. The pitch angle calculating portion 61 detects the angular velocity around the Y-axis of the turning body 6 based on the Y-axis angular velocity signal output from the second measuring portion 40*b* of the gyro sensor 40 and further calculates the pitch angle of the turning body 6 based on the angular velocity around the Y-axis. The rotational frequency calculating portion 62 detects the angular velocity around the Z-axis of the turning body 6 based on the Z-axis angular velocity signal output from the third measuring portion 40*c* of the gyro sensor 40 and further calculates the rotational frequency of the turning body 6 corresponding to the rotational frequency of the turning motor 17 based on the angular velocity around the Z-axis.

The turning direction detecting portion 63 detects a turning direction based on the sign (positive or negative) of the rotational frequency calculated by the rotational frequency calculating portion 62. For example, when the rotational frequency is a positive value, the turning direction detecting portion 63 detects that the turning direction corresponds to the first side in the predetermined direction (for example, a clockwise direction). In contrast, when the rotational frequency is a negative value, the turning direction detecting portion 63 detects that the turning direction corresponds to the second side in the predetermined direction (for example, a counterclockwise direction).

Based on the turning direction detected by the turning direction detecting portion 63 and the roll angle calculated by the roll angle calculating portion 60, the upward/downward turning detecting portion 64 detects whether the turning motor 17 makes the turning body 6 perform upward-turning or downward-turning as a turning operation. The upward-turning denotes that in a state where the turning body 6 is located at an oblique surface, a convex-concave surface, or the like and is inclined in the left-right direction, the turning body 6 is turned such that the structure extending portion 9 that is a turning body structural portion moves upward. In contrast, the downward-turning denotes that in a state where the turning body 6 is inclined in the left-right direction as with the upward-turning, the turning body 6 is turned such that the structure extending portion 9 moves downward. As above, the upward/downward turning detecting portion 64 detects the turning operation of the turning body 6 in order to consider the inclination of the turning body 6 in the left-right direction regarding the torque during the turn.

The correction value calculating portion 65 calculates a correction value based on the pitch angle calculated by the pitch angle calculating portion 61. The correction value is a value used to correct the torque of the turning motor 17 in accordance with the inclination of the turning body 6 in the front-rear direction. In the present embodiment, the correction value calculating portion 65 includes a map in which the correction value and the pitch angle are associated with each other, and the correction value calculating portion 65 calculates the correction value based on the pitch angle calculated by the pitch angle calculating portion 61. It should be noted that the correction value does not necessarily have to be calculated by the map and may be calculated from the pitch angle based on a preset calculation formula or the like.

The angular acceleration velocity calculating portion 66 calculates the angular acceleration velocity around the Z-axis of the turning body 6, i.e., a turn acceleration velocity of the turning body 6 based on the Z-axis angular velocity signal output from the third measuring portion 40*c* of the gyro sensor 40. Based on the turn acceleration velocity calculated by the angular acceleration velocity calculating portion 66, the acceleration/deceleration state detecting portion 67 detects whether the turning body 6 is in an acceleration state or a deceleration state.

The target torque calculating portion 68 calculates corrected target torque of the turning motor 17, the corrected target torque being corrected in accordance with the turning operation of the turning body 6. The corrected target torque denotes target torque of the turning motor 17, the target torque being corrected in accordance with the posture of the turning body 6. The target torque calculating portion 68 will be explained in detail. The target torque calculating portion 68 includes four torque maps in which the correction value and the roll angle are associated with the torque. These four torque maps correspond to four combinations regarding the turning operations and the acceleration and deceleration states. The target torque calculating portion 68 selects one torque map associated the detected turning operation and the detected acceleration or deceleration state and calculates the corrected target torque based on the selected torque map and the calculated correction value and roll angle.

The torque maps will be explained. In the torque maps, turn torque by which the turning motor 17 makes the turn of the turning body 6 accelerate is regarded as positive torque, and brake torque by which the turning motor 17 makes the turn of the turning body 6 decelerate is regarded as negative torque. In the acceleration state and the upward-turning operation, the corrected target torque in the torque maps is set to be higher than the uncorrected target torque. In the acceleration state and the downward-turning operation, the corrected target torque in the torque maps is set to be lower than the uncorrected target torque. Further, in the deceleration state and the upward-turning operation, the corrected target torque in the torque maps is set to be lower than the uncorrected target torque. In the deceleration state and the downward-turning operation, the corrected target torque in the torque maps is set to be higher than the uncorrected target torque.

Further, in order to eliminate the torque in the turning direction acting on the turning body 6 due to gravity, the corrected target torque is changed in accordance with the posture of the turning body 6 in each turning operation. For example, when the pitch angle (correction value) increases and the roll angle decreases in the upward-turning operation, the corrected target torque is set so as to decrease as the pitch angle increases (see a period from a time t1 to a time t3 in FIG. 7 described below). On the other hand, when both the pitch angle and the roll angle decrease in the downward-turning operation, the corrected target torque is set so as to further decrease as the pitch angle decreases (see a period from a time t6 to a time t8 in FIG. 7 described below). To be specific, the corrected target torque negatively increases as the pitch angle decreases, and thus, high brake torque is generated.

The target differential pressure calculating portion 69 first calculates a target supply/discharge differential pressure of the two supply/discharge ports 17a and 17b of the turning motor 17 based on the corrected target torque calculated by the target torque calculating portion 68. More specifically, the target differential pressure calculating portion 69 calculates the differential pressure of the two supply/discharge ports 17a and 17b necessary to make the turning motor 17 generate the corrected target torque. Further, in order to multiply the calculated differential pressure by a coefficient, the target differential pressure calculating portion 69 determines the coefficient in accordance with the turning direction detected by the turning direction detecting portion 63. To be specific, when the first side in the predetermined direction is detected, the calculated differential pressure is multiplied by the coefficient "1." When the second side in the predetermined direction is detected, the calculated differential pressure is multiplied by the coefficient "−1." As above, the target differential pressure calculating portion 69 calculates the target supply/discharge differential pressure based on the corrected target torque and changes the sign (positive or negative) of the target supply/discharge differential pressure in accordance with the turning direction.

The controller 39 includes a pressure command calculating portion 70. The pressure command calculating portion 70 calculates an actual supply/discharge differential pressure p3-p4 of the supply/discharge ports 17a and 17b based on pressure signals output from the hydraulic pressure sensors 35 and 36. Further, the pressure command calculating portion 70 performs feedback control of the set pressures of the electromagnetic relief valves 15 and 16 such that the supply/discharge differential pressure p3-p4 becomes the target supply/discharge differential pressure calculated by the target differential pressure calculating portion 69. To be specific, the pressure command calculating portion 70 outputs pressure commands to the electromagnetic relief valves 15 and 16 based on the supply/discharge differential pressure p3-p4 and the target supply/discharge differential pressure to change the set pressures of the electromagnetic relief valves 15 and 16 such that the supply/discharge differential pressure p3-p4 becomes the target supply/discharge differential pressure.

For example, when the spool 21 of the control valve 11 moves to the first offset position A1, and the supply/discharge differential pressure p3-p4 is positive, it is determined based on the calculation result of the pressure command calculating portion 70 that the turning body 6 is in the acceleration state. With this, the pressure command calculating portion 70 changes the set pressure of the electromagnetic relief valve 15 at an inlet side. On the other hand, when the spool 21 moves to the neutral position M, and the supply/discharge differential pressure p3-p4 is negative, it is determined based on the calculation result of the pressure command calculating portion 70 that the turning body 6 is in the deceleration state. With this, the pressure command calculating portion 70 changes the set pressure of the electromagnetic relief valve 16 at an outlet side. As above, even when the turning body 6 is inclined in the front-rear direction and/or the left-right direction, and the turning motor 17 is influenced by the load torque of the turning body structural portion, such as the boom, the torque of the turning motor 17 can be increased or decreased in accordance with the load torque. Therefore, regardless of the posture of the turning body 6, the operational feeling when turning the turning body 6 can be prevented from being deteriorated.

Based on the rotational frequency calculated by the rotational frequency calculating portion 62, the limited flow rate setting portion 73 sets an upper limit value (i.e., a limiting value) of the flow rate of the operating oil ejected from the hydraulic pump 10. More specifically, the limited flow rate setting portion 73 sets as the limiting value a value obtained by adding a preset offset flow rate to a necessary flow rate of the operating oil necessary for the rotational frequency (i.e., a current rotational frequency) calculated by the rotational frequency calculating portion 62. The offset flow rate is set to, for example, an increased flow rate required by the turning motor 17 when the turning motor 17 accelerates at a maximum acceleration velocity which can be output by the turning motor 17. It should be noted that the limiting value is not limited to the value obtained by adding the offset flow rate to the necessary flow rate of the operating oil and may be a value obtained by multiplying the necessary flow rate of the operating oil by a predetermined ratio.

The flow rate control block 52 controls the flow rate of the operating oil supplied to the turning motor 17, based on the turning state of the turning body 6. The flow rate control block 52 includes a command flow rate calculating portion 72 and a command flow rate limiting portion 74. Based on the pilot signal output from the pilot pressure sensor 27, the command flow rate calculating portion 72 calculates a command flow rate that is the flow rate of the operating oil required to be ejected from the hydraulic pump 10. In the present embodiment, the calculated differential pressure and the command flow rate correspond to each other, and the command flow rate calculating portion 72 calculates the command flow rate based on this correspondence. It should be noted that the command flow rate may be calculated based on a differential pressure between the pilot pressures p1 and p2 detected by pilot pressure sensors provided for the respective pilot pressures p1 and p2.

The command flow rate limiting portion 74 limits the command flow rate calculated by the command flow rate calculating portion 72, to not more than the limiting value set by the limited flow rate setting portion 73 and then outputs a flow rate command corresponding to the command flow rate. To be specific, when the command flow rate is less than the limiting value, the command flow rate limiting portion 74 outputs the pump tilt command corresponding to the command flow rate to the regulator 18. When the command flow rate is not less than the limiting value, the command flow rate limiting portion 74 outputs the pump tilt command corresponding to the limiting value to the regulator 18. As above, since the flow rate command value is limited to not more than the limiting value by the command flow rate limiting portion 74, the operating oil can be prevented from being ejected at the unnecessary flow rate from the hydraulic pump 10.

Operations of Hydraulic Driving System

Figure 6:
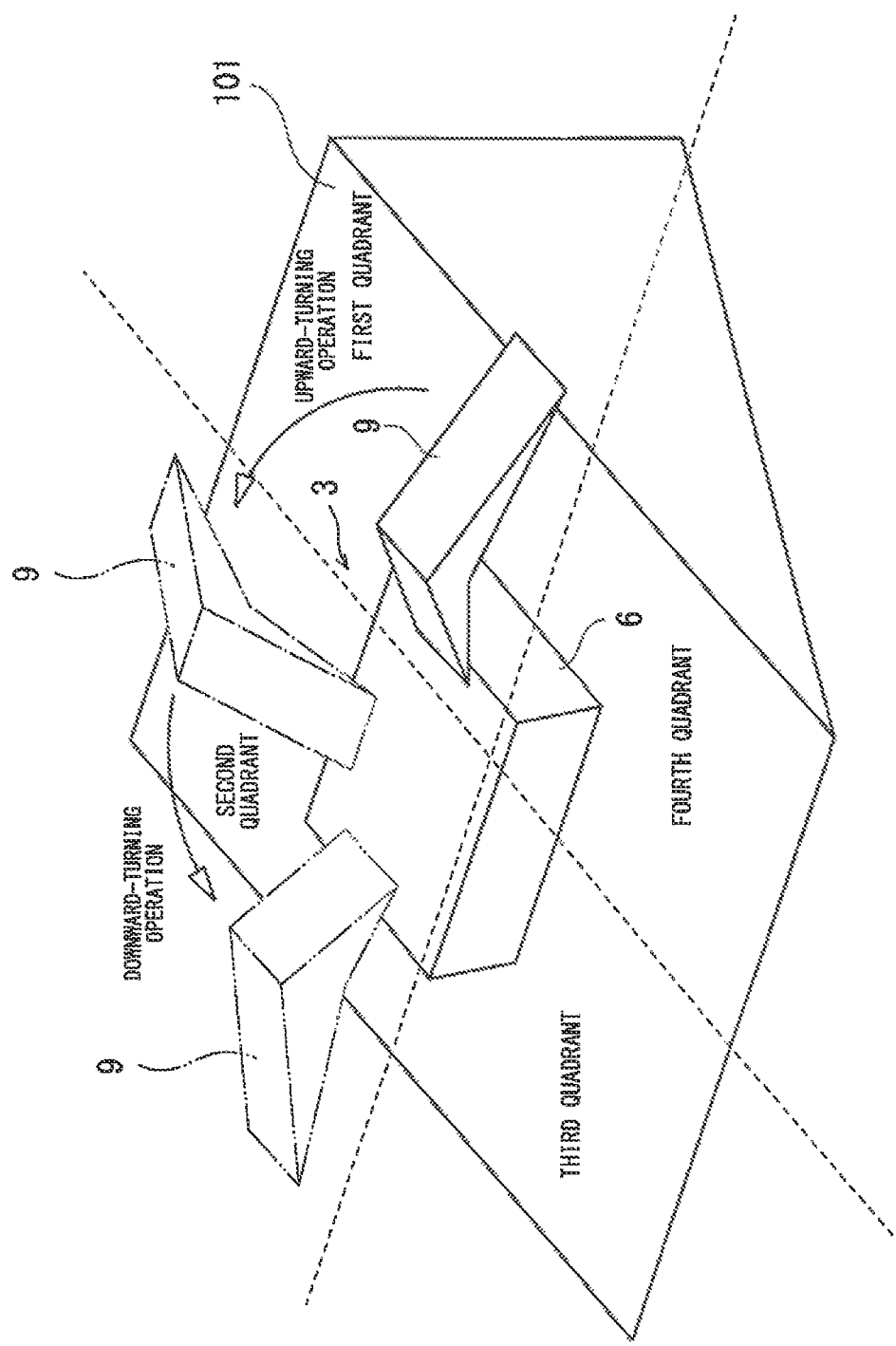
FIG. 6 is a schematic diagram showing the hydraulic excavator that turns on a slope way.
Figure 7:
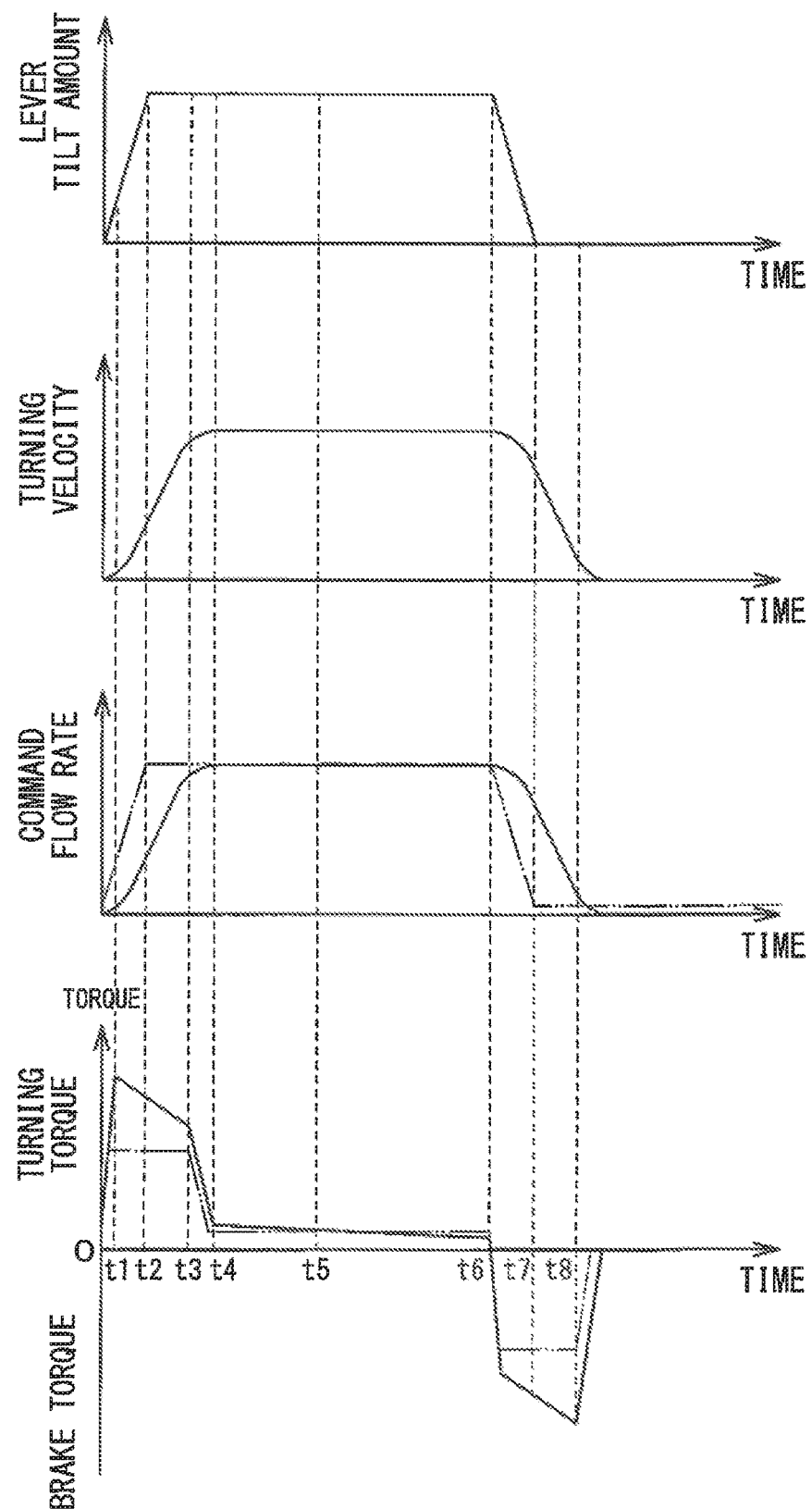
FIG. 7 is a graph showing time-lapse changes of a lever operation amount, a turning velocity of a turning body, a command flow rate, and torque of a turning motor in the hydraulic driving system of FIG. 5.
Figure 8:
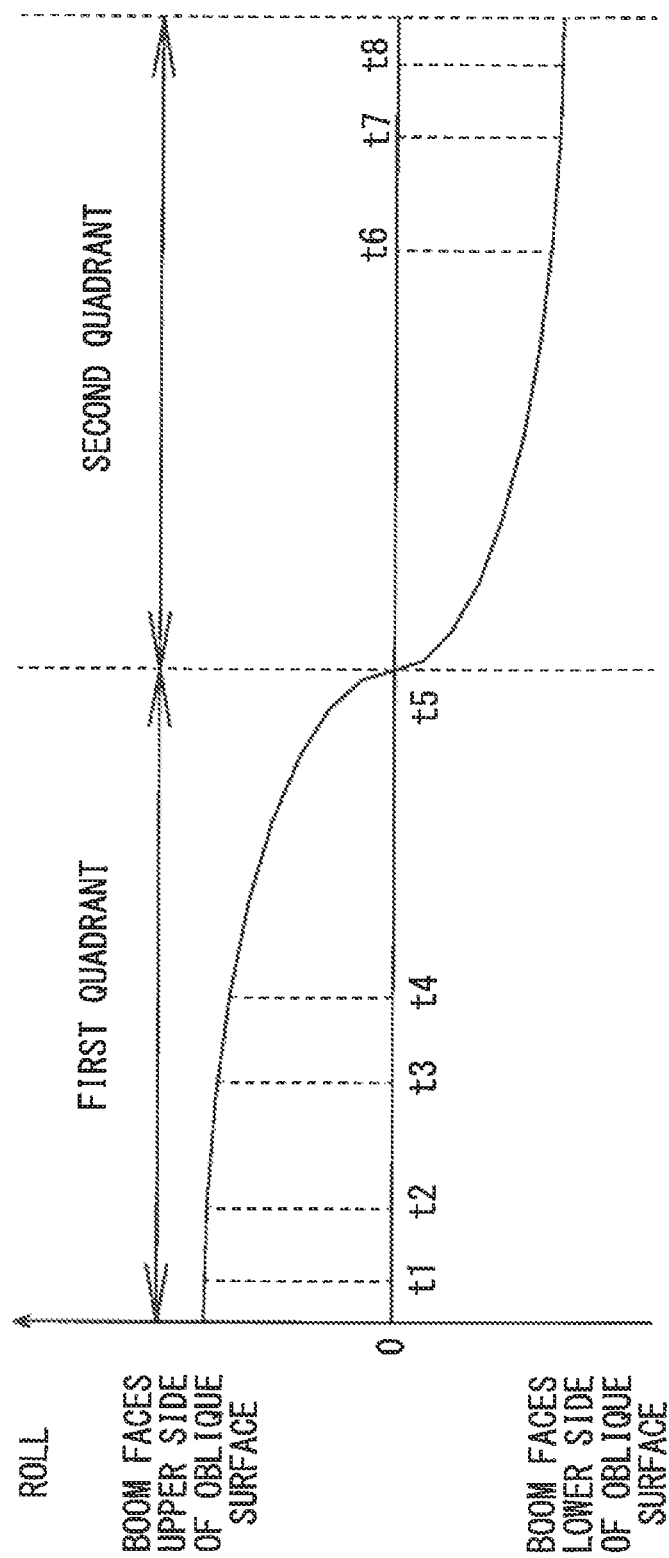
FIG. 8 is a graph showing a time-lapse change of a roll angle of the hydraulic excavator shown in FIG. 6.
Figure 9:
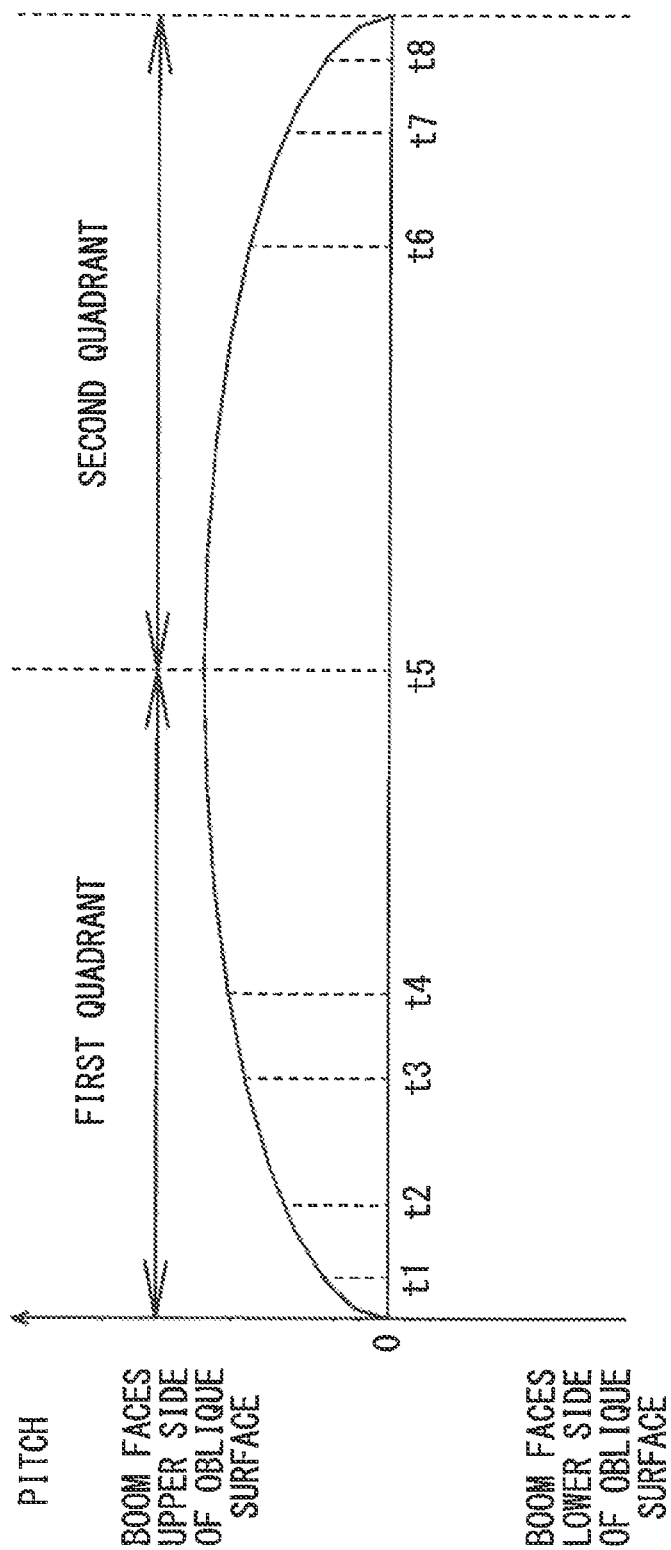
FIG. 9 is a graph showing a time-lapse change of a pitch angle of the hydraulic excavator shown in FIG. 6.

Hereinafter, the operations of the hydraulic driving system 1 will be explained with reference to FIGS. 8 and 9 based on an example in which in the hydraulic excavator 3 in a posture shown in FIG. 6, the operating lever 25 is tilted at the lever operation amount shown in the graph of FIG. 7. First, FIGS. 6 and 7 will be explained. In FIG. 6, the hydraulic excavator 3 is simplified. Further, FIG. 6 shows three states (a first stop state, an upward-facing state, and a second stop state) of the hydraulic excavator 3. The first stop state (see solid lines) is a state where the hydraulic excavator 3 stops with the boom 7 (i.e., the structure extending portion 9) facing in a direction perpendicular to an oblique surface of a slope way 101. The upward-facing state (see one-dot chain lines) denotes a state where the turning body 6 has performed the upward-turning from the first stop state, and the boom 7 (i.e., the structure extending portion 9) faces an upper side of the oblique surface. The second stop state (see two-dot chain lines) denotes a state where the turning body 6 has performed the downward-turning from the upward-facing state, and the boom 7 (i.e., the structure extending portion 9) faces the other side in the direction perpendicular to the oblique surface. Further, in FIG. 6, the slope way 101 is divided into four quadrants by a straight line extending on the oblique surface of the slope way 101 along the oblique surface with the hydraulic excavator 3 as a base point and another straight line perpendicular to the above straight line with the hydraulic excavator 3 as the base point. It should be noted that a quadrant located at an upper left side on the paper surface of FIG. 6 is a first quadrant, and second, third, and fourth quadrants are arranged in this order in a counterclockwise direction from the first quadrant. FIG. 7 shows a time-lapse change of the tilt amount of the operating lever 25, a time-lapse change of the turning velocity of the turning body 6, a time-lapse change of the ejection flow rate of the hydraulic pump 10, and a time-lapse change of the torque of the turning motor 17 in this order from an upper side. FIG. 8 shows a time-lapse change of the roll angle, and FIG. 9 shows a time-lapse change of the pitch angle. FIGS. 7 to 9 shows the time-lapse changes of the values when the turning body 6 of the hydraulic excavator 3 is made to perform angular displacement such that the state of the turning body 6 changes from the first stop state through the upward-facing state to the second stop state.

As shown in FIG. 7, for example, when the operating lever 25 is tilted in order to accelerate the turn of the turning body 6 toward the first side in the predetermined direction (see a period from a time t0 to a time t2 in FIG. 7), the pilot pressure p1 is output from the remote control valve 12. With this, the spool of the control valve 11 moves to the first offset position A1, and thus, the hydraulic pump 10 and the turning motor 17 communicate with each other. By this communication, the operating oil is supplied from the hydraulic pump 10 to the supply/discharge port 17a of the turning motor 17, and the turning motor 17 rotates. Further, by the output of the pilot pressure p1 from the remote control valve 12, a difference is generated between the two pilot pressures p1 and p2. The shuttle valve 26 selects a higher one of the pilot pressures p1 and p2, and the higher pressure is detected by the pilot pressure sensor 27. The pilot pressure sensor 27 outputs the pilot signal corresponding to the detected pressure to the command flow rate calculating portion 72, and the command flow rate calculating portion 72 calculates the command flow rate based on the pilot pressure input thereto (see a two-dot chain line of the command flow rate in FIG. 7).

The roll angle calculating portion 60, the pitch angle calculating portion 61, the rotational frequency calculating portion 62, and the angular acceleration velocity calculating portion 66 in the torque control block 51 calculate the roll angle, pitch angle, rotational frequency, and turn acceleration velocity of the turning body 6 based on three angular velocity signals output from the measuring portions 40a to 40c of the gyro sensor 40. The limited flow rate setting portion 73 of the flow rate control block 52 sets the limiting value of the command flow rate based on the rotational frequency of the turning body 6 calculated by the rotational frequency calculating portion 62 (see a graph solid line of the command flow rate in FIG. 7). The command flow rate limiting portion 74 increases the command flow rate calculated by the command flow rate calculating portion 72 while limiting the command flow rate such that the command flow rate does not exceed the set limiting value. Then, the command flow rate limiting portion 74 outputs the pump tilt command corresponding to the limited command flow rate to the regulator 18. With this, the flow rate of the operating oil ejected from the hydraulic pump 10 is limited to not more than the limiting value. Thus, the operating oil can be prevented from being ejected at an unnecessarily high flow rate.

Especially when the operating lever 25 is tilted at a predetermined tilt amount in a short period of time (in a period from the time t0 to the time t2 in FIG. 7), the turning velocity of the turning body 6 cannot be made to follow the tilt amount of the operating lever 25 due to inertia of the turning body 6. Therefore, even when the operating oil is ejected from the hydraulic pump 10 at the flow rate made to follow the tilt amount, the turning motor 17 cannot rotate at the turning velocity corresponding to the flow rate, and a surplus flow rate of the flow rate of the operating oil ejected from the hydraulic pump 10 is discharged without being supplied to the turning motor 17. To be specific, the operating oil flows at a flow rate that is more than the flow rate necessary for the turning operation. However, since the limiting value of the command flow rate is set by the limited flow rate setting portion 73, the unnecessary flow rate can be suppressed. Further, since the limiting value is set in accordance with the turning velocity (i.e., the inertia of the turning body 6), the operating oil can be discharged from the hydraulic pump 10 at a necessary and sufficient flow rate. Therefore, the effect of suppressing the ejection of the operating oil at the unnecessary flow rate can be further increased.

As above, in the hydraulic driving system 1, the limiting value is set by the limited flow rate setting portion 73, and the ejection amount of the hydraulic pump 10 can be increased to the flow rate corresponding to the tilt amount of the lever 25 while limiting the ejection amount of the hydraulic pump 10 in accordance with the limiting value. When the tilt amount of the operating lever 25 is kept constant, the controller 39 controls the operation of the regulator 18 such that the operating oil is ejected from the hydraulic pump 10 at the flow rate corresponding to the tilt amount that is kept constant. Thus, the controller 39 gradually increases the ejection amount of the hydraulic pump 10 to the above flow rate (see a period from the time t2 to the time t3 in FIG. 7).

While increasing the flow rate of the operating oil from the hydraulic pump 10, the controller 39 controls the operations of the electromagnetic relief valves 15 and 16 to adjust the torque of the turning motor 17. To be specific, in the torque control block 51 of the controller 39, the turning direction detecting portion 63 detects the turning direction of the turning body 6 based on the sign (positive or negative) of the rotational frequency calculated by the rotational frequency calculating portion 62. The upward/downward turning detecting portion 64 detects the turning operation of the turning body 6 based on the detected turning direction and the roll angle (see FIG. 8, for example) calculated by the roll angle calculating portion 60. The correction value calculating portion 65 calculates the correction value based on the pitch angle (see FIG. 9, for example) calculated by the pitch angle calculating portion 61. Further, based on the angular acceleration velocity calculated by the angular acceleration velocity calculating portion 66, the acceleration/deceleration state detecting portion 67 detects whether the turning body 6 is in the acceleration state or the deceleration state.

When the above various values are calculated, and the above various states are detected, the target torque calculating portion 68 selects one torque map corresponding to the detected turning operation and the detected acceleration or deceleration state and calculates the corrected target torque based on the selected torque map and the calculated roll angle and correction value. In the present embodiment, the turning body 6 performs the upward-turning immediately after the start of the turn and starts operating from the first stop state shown in FIG. 6. Therefore, immediately after the start of the turn, the load torque of the structure extending portion 9 acts on the turning motor 17 so as to decelerate the turning body 6. On this account, the calculated corrected target torque becomes the highest immediately after the start of the turn. After that, when the turning body 6 performs the upward-turning in the first quadrant of FIG. 6, the roll angle (see the first quadrant in FIG. 8) of the turning body 6 decreases, and the pitch angle of the turning body 6 increases (see the first quadrant in FIG. 9). Accordingly, the corrected target torque decreases. When the turning body 6 performs the downward-turning in the fourth quadrant of FIG. 6 from the first stop state, the load torque of the turning body structural portion, such as the boom, acts on the turning motor 17 so as to accelerate the turning body 6. Therefore, the corrected target torque acts in the opposite manner. To be specific, the corrected target torque becomes the lowest value immediately after the start of the turn. Further, when the turning body 6 performs the downward-turning in the fourth quadrant, the roll angle of the turning body 6 decreases, and the pitch angle of the turning body 6 decreases. Accordingly, the corrected target torque increases.

The target differential pressure calculating portion 69 calculates the target supply/discharge differential pressure of the turning motor 17 based on the calculated corrected target torque and the detected turning direction. The pressure command calculating portion 70 outputs to the electromagnetic relief valves 15 and 16 the pressure commands corresponding to the calculated target supply/discharge differential pressure and the actual supply/discharge differential pressure p3-p4. With this, the set pressures of the electromagnetic relief valves 15 and 16 are changed, and the turning motor 17 outputs such turn torque that becomes the highest immediately after the start of the turn (see the time t1 in the graph of the torque in FIG. 7) and decreases as the roll angle of the turning body 6 decreases as shown in FIG. 7 (see a period from the time t1 to the time t3 in the graph of the torque in FIG. 7). As above, when the turn of the turning body 6 is accelerated by tilting the operating lever 25, the controller 39 makes the turning motor 17 output the turn torque corresponding to the roll angle and pitch angle of the turning body 6 (i.e., the posture of the turning body 6). With this, the correspondence between the tilt amount of the operating lever 25 and the acceleration of the turning motor 17 can be prevented from being changed by the posture of the turning body 6, and the operational feeling of the operating lever 25 when turning the turning body 6 can be prevented from being deteriorated by the posture of the turning body 6.

When the turn of the turning body 6 is accelerated, and then, the tilt amount of the operating lever 25 is kept constant (see a period from the time t2 to a time t4 in the graph of the lever tilt amount in FIG. 7), the operating oil is ejected from the hydraulic pump 10 at the flow rate corresponding to the tilt amount of the operating lever 25 (see a period from the time t4 to the time t6 in the graph of the command flow rate in FIG. 7). Further, since the tilt amount of the operating lever 25 is kept constant, opening areas of the ports 11*a* to 11*d* of the control valve 11 are kept substantially constant. With this, the flow rate of the operating oil supplied from the hydraulic pump 10 to the turning motor 17 is kept substantially constant.

Further, in the torque control block 51 of the controller 39, as with the acceleration of the turn of the turning body 6, the roll angle, pitch angle, rotational frequency, and turn acceleration velocity of the turning body 6 are calculated by the calculating portions 60 to 62 and 66, and based on the calculated values, the turning operation of the turning body 6 and the acceleration or deceleration state of the turning body 6 are detected by the detecting portions 64 and 67, and the correction value is calculated by the correction value calculating portion 65. Further, the target torque calculating portion 68 selects one torque map based on the detected turning operation and the detected acceleration or deceleration state and calculates the corrected target torque based on the selected torque map, the roll angle, and the correction value. In an initial stage, the turning body 6 is inclined in the left-right direction and performs the upward-turning, and as with the above-described acceleration, the load torque of the turning body structural portion, such as the boom, influences the torque of the turning motor 17 so as to decelerate the turn of the turning body 6, and this influence decreases as the roll angle decreases and the pitch angle increases. Therefore, the corrected target torque decreases as the roll angle decreases. Further, the corrected target torque refers to the correction value corresponding to the pitch angle, and the corrected target torque decreases as the pitch angle increases. To be specific, as the roll angle of the turning body 6 decreases, and the pitch angle of the turning body 6 increases, the torque of the turning motor 17 decreases (see a period from the time t4 to a time t5 in the graph of the torque in FIG. 7), and the turning body 6 can be made to turn at a constant velocity regardless of the posture of the turning body 6.

After that, when the turning body 6 continuously performs the upward-turning, the hydraulic excavator 3 soon becomes the upward-facing state. When the turning body 6 further turns from this state, the turning state of the turning body 6 switches from the upward-turning to the downward-turning (see the time t5 in the graph of FIG. 7). When the turning state switches, the structure extending portion 9 moves from the first quadrant to the second quadrant, and the roll angle changes from zero to a negative angle as shown in FIG. 8. With this, the load torque of the turning body structural portion influences the torque of the turning motor 17 so as to accelerate the turn of the turning body 6. This influence increases as the roll angle decreases (i.e., as an absolute value of the roll angle increases). Therefore, the torque of the turning motor 17 slightly decreases (see a period from the time t5 to the time t6 in the graph of the torque in FIG. 7). However, by keeping the command flow rate constant, the turning body 6 can turn at a constant velocity regardless of the posture of the turning body 6.

When the driver returns the operating lever 25 to the neutral position after the turn at the constant velocity (see a period from the time t6 to a time t7 in the graph of the lever tilt amount in FIG. 7), the ports 11a to 11d of the control valve 11 gradually close. With this, the operating oil discharged from the first supply/discharge port 17b of the turning motor 17 is not discharged to the tank by the control valve 11, and the brake torque is generated at the turning motor 17. Further, by returning the operating lever 25 to the neutral position, the pilot pressure p1 output from the remote control valve 12 and selected as the higher pressure by the shuttle valve 26 decreases. With this, the command flow rate calculated by the command flow rate calculating portion 72 decreases, and the flow rate of the operating oil ejected from the hydraulic pump 10 decreases.

Further, in the torque control block 51 of the controller 39, as with the acceleration of the turn of the turning body 6, the roll angle, pitch angle, rotational frequency, and turn acceleration velocity of the turning body 6 are calculated by the calculating portions 60 to 62 and 66, and based on the calculated values, the turning operation of the turning body 6 and the acceleration or deceleration state of the turning body 6 are detected by the detecting portions 64 and 67, and the correction value is calculated by the correction value calculating portion 65. Further, the target torque calculating portion 68 selects one torque map based on the detected turning operation and the detected acceleration or deceleration state and calculates the corrected target torque based on the selected torque map, the roll angle, and the correction value. In the present embodiment, the turning body 6 is performing the downward-turning when the operating lever 25 is returned to the neutral position. The load torque of the turning body structural portion, such as the boom, influences the torque of the turning motor 17 so as to accelerate the turn of the turning body 6. This influence increases as the roll angle and the pitch angle decrease (see the second quadrant in FIGS. 8 and 9). Therefore, the corrected target torque decreases (the absolute value of the corrected target torque increases) as the roll angle and the pitch angle decrease. To be specific, the brake torque of the turning motor 17 increases as the roll angle and pitch angle of the turning body 6 decrease (see a period from the time t6 to the time t8 in the graph of the torque in FIG. 7). Therefore, the correspondence between the return amount of the operating lever 25 and the deceleration of the turning motor 17 can be prevented from being changed by the posture of the turning body 6, and the operational feeling of the operating lever 25 when turning the turning body 6 can be prevented from being deteriorated by the posture of the turning body 6.

As above, in the hydraulic excavator 3, the load torque acting on the turning motor 17 from the structure extending portion 9 changes by the change of the posture of the turning body 6. Further, in the hydraulic driving system 1, the controller 39 changes the set pressures of the electromagnetic relief valves 15 and 16 in accordance with the posture, turning direction, and acceleration/deceleration state of the turning body 6 to adjust the torque (turn torque or brake torque) of the turning motor 17. With this, the operational feeling of the operating lever 25 can be prevented from being deteriorated by the posture, turning direction, and acceleration/deceleration state of the turning body 6.

In the hydraulic driving system 1 of Embodiment 1, since the turning velocity of the turning body 6 can be detected by using the gyro sensor 40, it is unnecessary to attach, for example, a rotation sensor to the turning motor 17. Further, the controller unit 2 is arranged at, for example, the turning body 6, more specifically, at the driver's seat 6a (i.e., the cabin) of the turning body 6, and the gyro sensor 40 is incorporated in the controller 39 arranged at such position. Therefore, the gyro sensor 40 can be arranged away from the operating oil and can also be arranged at a position that is not directly exposed to rain water. With this, it is unnecessary to take, for example, measures to protect the gyro sensor 40 from the operating oil, high temperature, and rain water. In addition, since the gyro sensor 40 is incorporated in the controller 39, the distance between the gyro sensor 40 and the controller 39 can be made short (more specifically, can be set to zero), and an external wire (signal wire provided outside the controller) between the gyro sensor 40 and the controller 39 can be omitted. As above, it is unnecessary to take measures to protect the gyro sensor from oil, high temperature, water, and the like, and the external wire can be omitted. Since it is unnecessary to take the measures to protect the gyro sensor 40 from oil, high temperature, water, and the like, and the signal wire can be made short, cost for attaching the gyro sensor 40 can be reduced, and handling of the gyro sensor 40 can be facilitated.

The controller unit 2 is arranged at the turning body 6 such that: the X-axis of the gyro sensor 40 incorporated in the controller 39 coincides with the front-rear direction of the turning body 6, i.e., the direction in which the boom 7 (i.e., the structure extending portion 9) extends; and the Y-axis and Z-axis of the gyro sensor 40 coincide with the left-right direction and the upper-lower direction, respectively. With this, the roll angle, pitch angle, and rotational frequency of the turning body 6 can be detected by one gyro sensor 40, so that the number of parts can be prevented from increasing. Further, since the turning direction can be detected by using the gyro sensor 40, the number of pilot pressure sensors provided at the remote control valve 12 can be set to one. To be specific, the number of pilot pressure sensors provided at the remote control valve 12 can be reduced.

Embodiment 2

Figure 10:
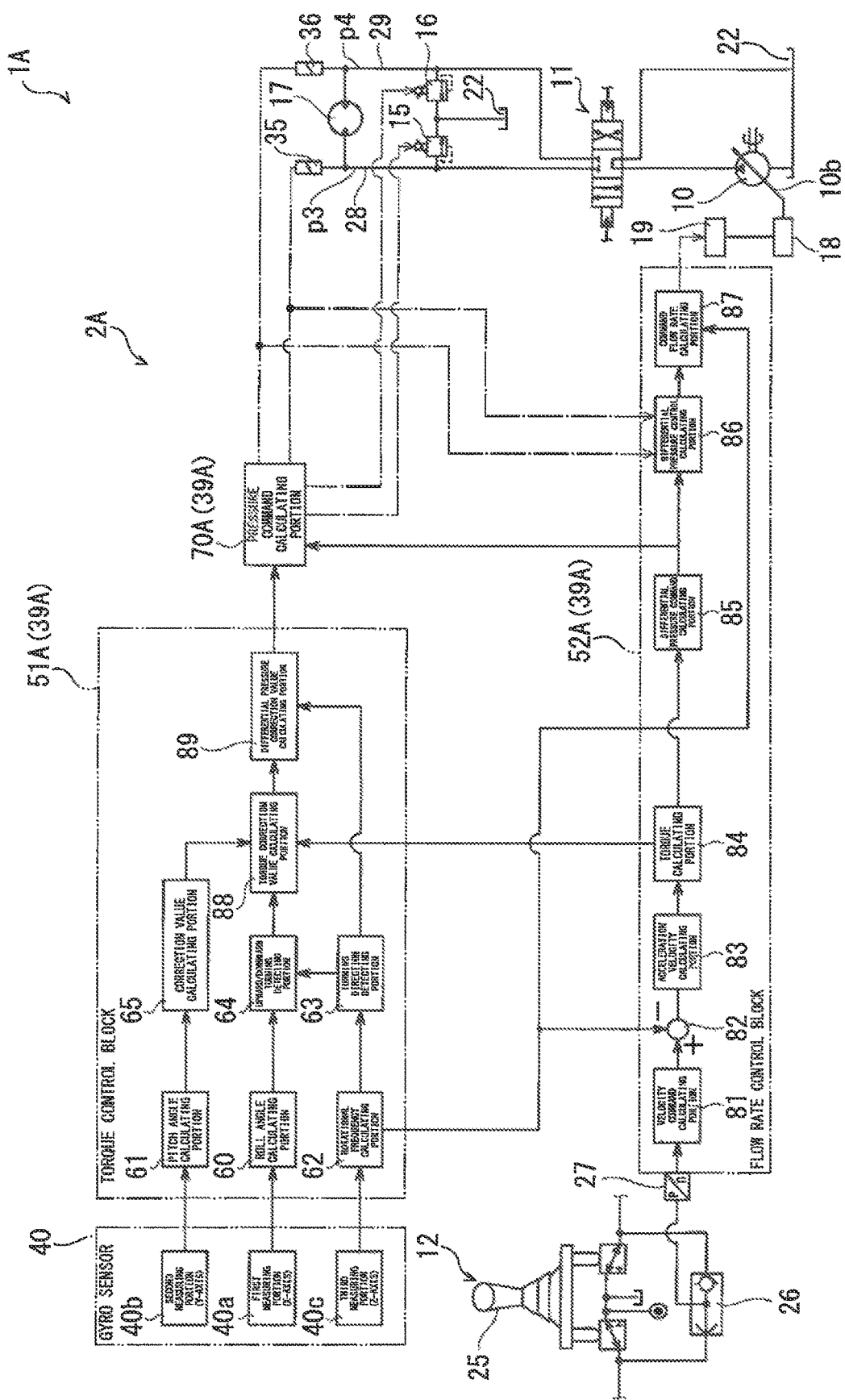
FIG. 10 is a block diagram showing control blocks constituting the controller included in the hydraulic driving system of Embodiment 2.

As shown in FIG. 10, the hydraulic driving system 1A and the controller unit 2A in Embodiment 2 are similar in configuration to the hydraulic driving system 1 of Embodiment 1. Hereinafter, components of the hydraulic driving system 1A which are different from the components of the hydraulic driving system 1 of Embodiment 1 will be mainly explained, and explanations of the same components are omitted. The same is true for the hydraulic driving systems 1B and 1C of Embodiments 3 and 4 explained below and hydraulic driving systems 1D and 1E of Other Embodiments explained below.

In the hydraulic driving system 1A of Embodiment 2, a controller 39A of the controller unit 2A includes a torque control block 51A and a flow rate control block 52A, and the flow rate control block 52A includes a velocity command calculating portion 81, a deviation calculating unit 82, an acceleration velocity calculating portion 83, a torque calculating portion 84, a differential pressure command calculating portion 85, a differential pressure control calculating portion 86, and a flow rate command calculating portion 87. The velocity command calculating portion 81 calculates a velocity command value based on the differential pressure of the pilot pressure sensor 27. The velocity command value is a command value indicating a target turning velocity of the turning body 6, in other words, a value corresponding to the tilt amount of the operating lever.

The deviation calculating unit 82 calculates a velocity difference by subtracting the rotational frequency (i.e., the actual turning velocity) calculated by the rotational frequency calculating portion 62 of the torque control block 51A, from the velocity command (i.e., the turning velocity as the target) calculated by the velocity command calculating portion 81. The acceleration velocity calculating portion 83 calculates a target angular acceleration velocity of the turning motor 17 based on the velocity difference calculated by the deviation calculating unit 82. The torque calculating portion 84 calculates the target torque of the turning motor 17 based on the target angular acceleration velocity calculated by the acceleration velocity calculating portion 83. It should be noted that: in the acceleration state, the target angular acceleration velocity is a positive value; and in the deceleration state, the target angular acceleration velocity is a negative value. Further, when the target torque is a positive value, it is turn torque. When the target torque is a negative value, it is brake torque.

In order to make the turning motor 17 generate the calculated target torque, the differential pressure command calculating portion 85 calculates the target supply/discharge differential pressure of the two supply/discharge ports 17a and 17b of the turning motor 17. The differential pressure control calculating portion 86 calculates the actual supply/discharge differential pressure of the two supply/discharge ports 17a and 17b based on the signals output from the hydraulic pressure sensors 35 and 36 and subtracts the actual supply/discharge differential pressure from the target supply/discharge differential pressure to obtain a differential value. Based on the differential value, the differential pressure control calculating portion 86 further calculates a flow rate increase/decrease value by which the flow rate of the operating oil ejected from the hydraulic pump 10 is increased or decreased.

The flow rate increase/decrease value calculated by the differential pressure control calculating portion 86 is used by the flow rate command calculating portion 87. The flow rate command calculating portion 87 calculates the flow rate of the operating oil to be ejected from the hydraulic pump 10, based on the rotational frequency calculated by the rotational frequency calculating portion 62 of the torque control block 51A and further calculates the flow rate command value by increasing or decreasing the calculated flow rate based on the flow rate increase/decrease value calculated by the differential pressure control calculating portion 86. Further, the flow rate command calculating portion 87 outputs to the regulator 18 the pump tilt command corresponding to the calculated flow rate command value to make the hydraulic pump 10 eject the operating oil at the flow rate corresponding to the flow rate command value.

The torque control block 51A does not include the angular acceleration velocity calculating portion 66 and the acceleration/deceleration state detecting portion 67. Further, instead of the target torque calculating portion 68 and the target differential pressure calculating portion 69, the torque control block 51A includes a torque correction value calculating portion 88 and a differential pressure correction value calculating portion 89. The torque correction value calculating portion 88 calculates a correction value by which the torque calculated by the torque calculating portion 84 is corrected in accordance with the posture of the turning body 6. More specifically, the torque correction value calculating portion 88 includes two torque correction value maps in which the correction value and the roll angle are associated with the torque correction value. Each of the two torque correction maps is associated with the turning operation. The torque correction value calculating portion 88 selects one of the two torque correction maps in accordance with the detected turning operation and calculates the torque correction value by using the selected torque correction value map based on the correction value and roll angle calculated by the calculating portions 65 and 60.

It should be noted that when the turn acceleration torque is a positive value, and the brake torque is a negative value, the torque correction value in the torque correction value maps is set to a positive value in the upward-turning operation and is set to a negative value in the downward-turning operation. In order to eliminate the torque in the turning direction acting on the turning body 6 due to gravity, the corrected target torque is changed in accordance with the posture of the turning body 6 in each turning operation. For example, when the pitch angle (correction value) increases and the roll angle decreases in the upward-turning operation, the torque correction value is set so as to decrease as the pitch angle increases. On the other hand, when both the pitch angle and the roll angle decrease in the downward-turning operation, the torque correction value is set so as to further decrease as the pitch angle decreases.

The differential pressure correction value calculating portion 89 calculates a supply/discharge differential pressure correction value based on the torque correction value calculated by the torque correction value calculating portion 88. The supply/discharge differential pressure correction value is a correction value by which the target supply/discharge differential pressure is corrected. The differential pressure correction value calculating portion 89 will be explained in more detail. The differential pressure correction value calculating portion 89 calculates a differential pressure correction value of the two supply/discharge ports 17a and 17b, the differential pressure correction value corresponding to the torque correction value. Further, the differential pressure correction value calculating portion 89 multiplies the calculated differential pressure correction value by the coefficient corresponding to the turning direction detected by the turning direction detecting portion 63. To be specific, when the first side in the predetermined direction is detected, the calculated differential pressure correction value is multiplied by the coefficient "1." When the second side in the predetermined direction is detected, the calculated differential pressure correction value is multiplied by the coefficient "−1." As above, the differential pressure correction value calculating portion 89 converts the torque correction value into the supply/discharge differential pressure correction value and changes the sign (positive or negative) of the supply/discharge differential pressure correction value in accordance with the turning direction.

The controller 39A includes a pressure command calculating portion 70A. The pressure command calculating portion 70A corrects the target supply/discharge differential pressure calculated by the differential pressure command calculating portion 85, based on the supply/discharge differential pressure correction value calculated by the differential pressure correction value calculating portion 89. To be specific, the pressure command calculating portion 70A calculates the corrected target supply/discharge differential pressure by adding the differential pressure correction value to the target supply/discharge differential pressure. Further, the pressure command calculating portion 70A calculates the actual supply/discharge differential pressure of the two supply/discharge ports 17a and 17b based on the signals output from the hydraulic pressure sensors 35 and 36. The pressure command calculating portion 70A outputs the pressure commands to the electromagnetic relief valves 15 and 16 to change the set pressures of the electromagnetic relief valves 15 and 16 such that the actual supply/discharge differential pressure becomes the corrected target supply/discharge differential pressure. With this, the torque of the turning motor 17 can be increased or decreased in accordance with the posture of the turning body 6. Therefore, regardless of the posture of the turning body 6, the operational feeling when turning the turning body 6 can be prevented from being deteriorated.

As above, in the hydraulic driving system 1A, the differential pressure of the turning motor 17, i.e., the target torque of the turning motor 17 is calculated in accordance with the operation amount of the operating lever 25. Therefore, the output shaft of the turning motor 17 can be rotated or decelerated at the acceleration velocity corresponding to the operation amount of the operating lever 25. Since the torque correction value corresponding to the posture of the turning body 6 is calculated in the torque control block 51A, the target torque is corrected in accordance with the posture of the turning body 6. With this, the operational feeling when turning the turning body 6 can be prevented from being deteriorated by the posture of the turning body 6.

Other than the above, the hydraulic driving system 1A of Embodiment 2 has the same operational advantages as the hydraulic driving system 1 of Embodiment 1.

Embodiment 3

Figure 11:
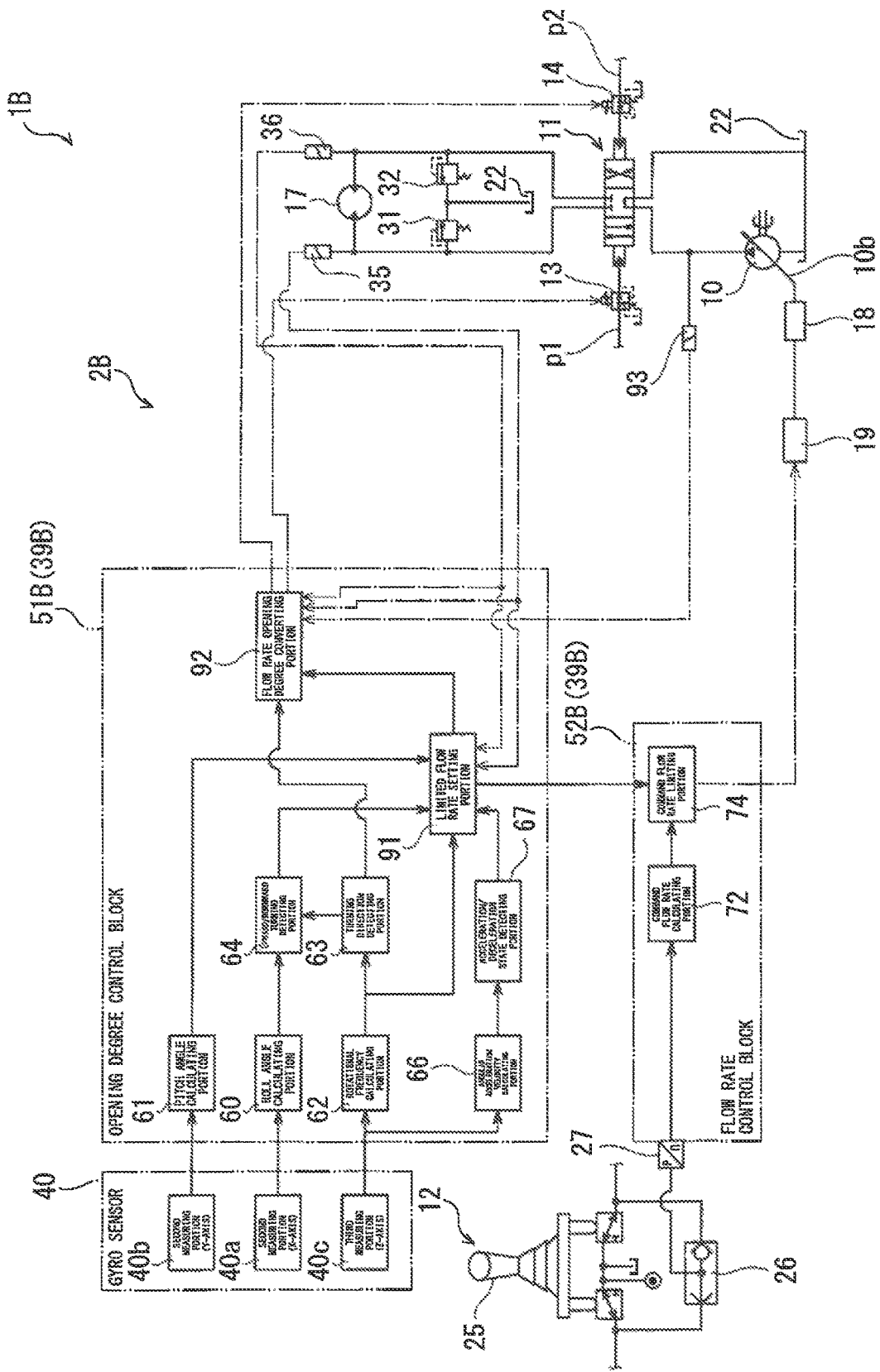
FIG. 11 is a block diagram showing control blocks constituting the controller included in the hydraulic driving system of Embodiment 3.

As shown in FIG. 11, the hydraulic driving system 1B of Embodiment 3 includes a controller unit 2B, and the controller unit 2B includes a controller 39B. The controller 39B includes an opening degree control block 51B and a flow rate control block 52B. The opening degree control block 51B includes the roll angle calculating portion 60, the pitch angle calculating portion 61, the rotational frequency calculating portion 62, the turning direction detecting portion 63, the upward/downward turning detecting portion 64, the angular acceleration velocity calculating portion 66, the acceleration/deceleration state detecting portion 67, a limited flow rate setting portion 91, and a flow rate opening degree converting portion 92. In order to suppress excessive deceleration and insufficient acceleration of the turning motor 17 due to the posture of the turning body 6 during the upward-turning and to suppress excessive acceleration and insufficient deceleration of the turning velocity of the turning body 6 due to the posture of the turning body 6 during the downward-turning, the limited flow rate setting portion 91 limits the flow rate of the operating oil discharged from the turning motor 17.

More specifically, as with the limited flow rate setting portion 73 of Embodiment 1, based on the rotational frequency calculated by the rotational frequency calculating portion 62, the limited flow rate setting portion 91 first sets an upper limit value (i.e., a limiting value) of the flow rate of the operating oil ejected from the hydraulic pump 10. Further, the limited flow rate setting portion 91 includes a plurality of flow rate correction maps and sets a flow rate correction value based on the flow rate correction maps. Hereinafter, the setting of the flow rate correction value will be specifically explained.

In the flow rate correction maps, the pitch angle and the roll angle are associated with the flow rate correction value, and the flow rate correction value can be obtained from the pitch angle and the roll angle. Further, the flow rate correction maps are associated with the turning operations and the acceleration and deceleration states, and the limited flow rate setting portion 91 changes the flow rate correction map to be used, in accordance with the detected state and operation. It should be noted that in the upward-turning operation and the acceleration state, the flow rate correction map is changed further in accordance with the pressure states (i.e., a pressure state of an inlet) of the supply/discharge ports 17a and 17b of the turning motor 17. The pressure states of the inlet and the outlet denote whether or not the pressure of the inlet has reached relief pressure.

To be specific, the limited flow rate setting portion 91 first determines the turning operation and the acceleration or deceleration state based on the detection results of the upward/downward turning detecting portion 64 and the acceleration/deceleration state detecting portion 67. Next, the limited flow rate setting portion 91 detects the inlet pressure and outlet pressure of the turning motor 17 by the hydraulic pressure sensors 35 and 36 and determines the pressure state of the inlet based on the inlet pressure and the outlet pressure. Then, the limited flow rate setting portion 91 selects one flow rate correction map associated with these three determination results. After the selection, the limited flow rate setting portion 91 calculates the flow rate correction value based on the selected flow rate correction map and the calculated pitch angle and roll angle. Further, the limited flow rate setting portion 91 corrects the limiting value by multiplying the calculated necessary flow rate by the calculated flow rate correction value and sets the corrected limiting value as a new limiting value. The new limiting value set as above is used by the flow rate opening degree converting portion 92 and the command flow rate limiting portion 74.

In order that the flow rate of the operating oil supplied to and discharged from the turning motor 17 is limited to the corrected limiting value or less, the flow rate opening degree converting portion 92 calculates the opening degrees of the ports 11a to 11d of the control valve 11. To be specific, the flow rate opening degree converting portion 92 calculates the differential pressure before and after the spool 21 of the control valve 11 based on the signals output from a hydraulic pressure sensor 93 and the hydraulic pressure sensors 35 and 36 and then calculates the opening degrees of the ports 11a to 11d of the control valve 11 by using the calculated differential pressure and the corrected limiting value based on a calculation formula regarding the flow of a restrictor. The flow rate opening degree converting portion 92 supplies to the electromagnetic pressure reducing valves 13 and 14 currents corresponding to the calculated opening degrees of the ports 11a to 11d to move the spool 21 such that the flow rate of the operating oil discharged from the turning motor 17 becomes the limiting value or less.

On the other hand, the command flow rate limiting portion 74 limits the command flow rate calculated by the command flow rate calculating portion 72, to not more than the corrected limiting value set by the limited flow rate setting portion 91 and then outputs the flow rate command corresponding to the command flow rate. With this, the flow rate of the operating oil ejected from the hydraulic pump 10 can be limited to not more than the corrected limiting value, and the operating oil can be prevented from being ejected at the unnecessary flow rate from the hydraulic pump 10.

As above, in the hydraulic driving system 1B, the flow rate of the operating oil supplied to and discharged from the turning motor 17 is limited based on the limiting value calculated by the limited flow rate setting portion 91. As described above, the limited flow rate setting portion 91 calculates the flow rate correction value based on the flow rate correction map and sets the new limiting value based on the flow rate correction value and the necessary flow rate. It should be noted that the hydraulic pressure sensors 35 and 36 may be omitted by: determining the state of the inlet pressure of the turning motor 17 by the pressure sensor 93; and setting the differential pressure before and after the spool 21 to an assumed value in advance. Hereinafter, the flow rate correction map necessary when setting the limiting value will be more specifically explained with reference to the graph of FIG. 12.

Figure 12:
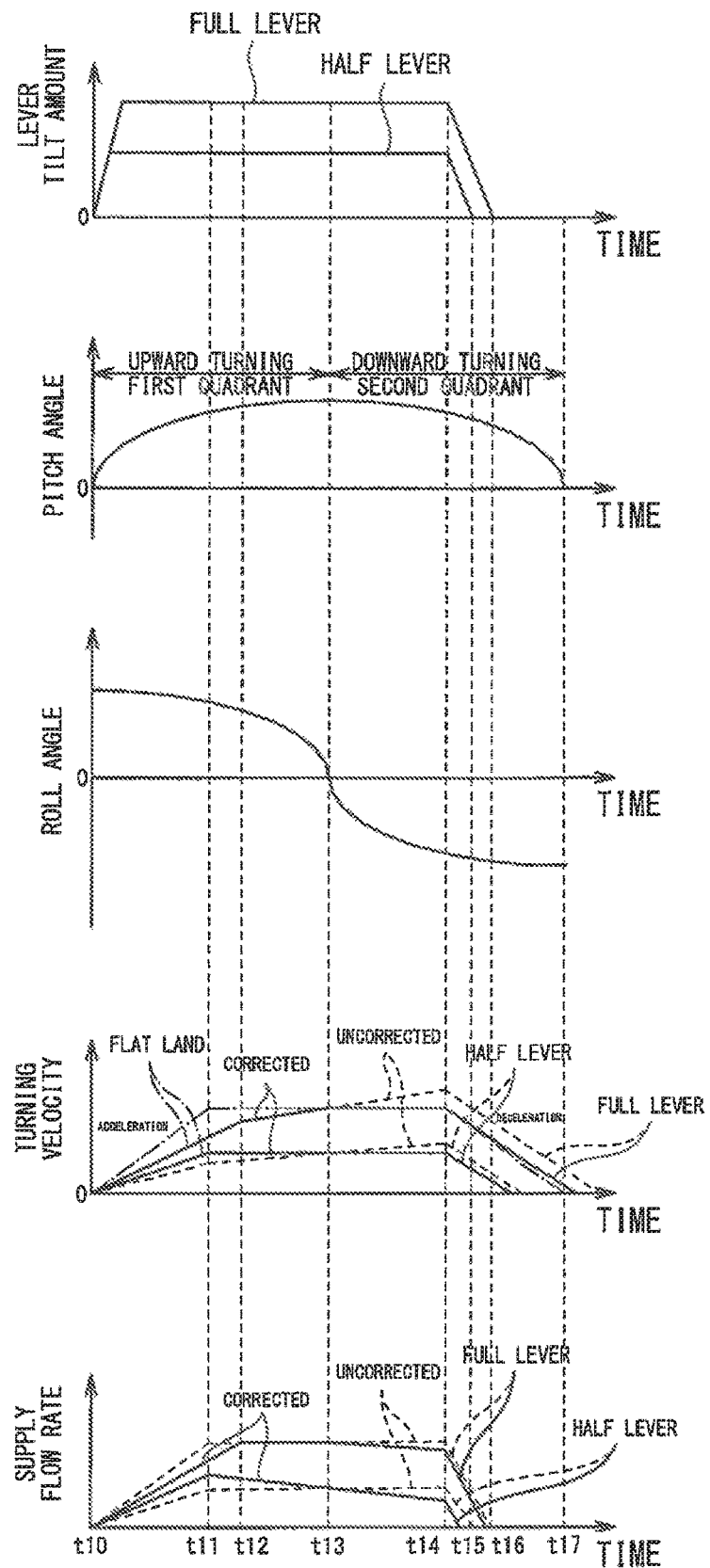
FIG. 12 is a graph showing time-lapse changes of a lever tilt amount, the pitch angle, the roll angle, the turning velocity, the torque, and the command flow rate in the hydraulic driving system of Embodiment 3.

FIG. 12 shows time-lapse changes of various values when the hydraulic excavator 3 moves from the first stop state to the second stop state by turning the turning body 6 as with Embodiment 1. To be specific, FIG. 12 shows time-lapse changes of the tilt amount of the operating lever 25, the pitch angle of the turning body 6, the roll angle of the turning body 6, the turning velocity of the turning body 6, and the flow rate of the operating oil supplied to the turning motor 17 in this order from an upper side. Further, FIG. 12 shows time-lapse changes of various values at the time of a full-lever operation and a half-lever operation. The full-lever operation denotes a case where the operating lever is quickly operated, and the half-lever operation denotes a case where the operating lever is slowly operated. It should be noted that in order to facilitate the comparison between the full-lever operation and the half-lever operation, a time scale of a horizontal axis is changed such that the change in the pitch angle and the change in the roll angle become the same between these operations.

As described above, each of the flow rate correction maps in the present embodiment is associated with the turning operation, the acceleration/deceleration state, and the pressure state of the inlet. For example, in the flow rate correction map regarding the upward-turning operation (for example, at the time of the half-lever operation or at the time of the operation simultaneously with the operation of a working machine actuator) in a state where the inlet pressure of the turning motor 17 does not reach the relief pressure, the flow rate correction value is set to a value greater than one regardless of acceleration and deceleration operations. To be specific, in the upward-turning operation, the limiting value is made large, and therefore, the flow rate of the operation oil supplied to the turning motor 17 can be prevented from becoming lower than that when the turning motor 17 turns on a flat land (see corrected graphs in a period from a time t10 to a time t11 in FIG. 12). With this, the operational feeling can be improved. It should be noted that since the torque to be generated by the turning motor 17 is different between the acceleration state and the deceleration state, the flow rate correction map to be used is different therebetween.

On the other hand, in the upward-turning operation in a state where the inlet pressure of the turning motor 17 has reached the relief pressure (i.e., in the full-lever operation) and in the acceleration state, the flow rate correction value can be set to a value less than one (see corrected graphs in a period from the time t10 to a time t12 in FIG. 12). With this, the flow rate of the operating oil supplied to the turning motor 17 can be reduced. To be specific, the operating oil can be prevented from being excessively supplied to the turning motor 17, and the flow rate of the operating oil discharged from the relief valves 31 and 32 can be reduced. With this, energy efficiency can be improved.

Further, in the downward-turning operation, the flow rate correction value is set to a value less than one regardless of the acceleration and deceleration operations, and the limiting value is made small. Therefore, the turning velocity of the turning body 6 can be prevented from excessively increasing or insufficiently decreasing as compared to a case where the turning body 6 turns on a flat land. With this, the operational feeling can be improved. It should be noted that since the torque to be generated by the turning motor 17 is different between the acceleration state and the deceleration state, the flow rate correction map to be used is different therebetween.

As above, each of the flow rate correction maps is associated with the turning operation, the acceleration/deceleration state, and the pressure state of the inlet. In accordance with the turning operation, the acceleration/deceleration state, and the pressure state of the inlet, the flow rate correction value defined in each flow rate correction map is set to one or more or less than one. Further, in the hydraulic driving system 1B, the velocity of the turning body 6 is controlled by controlling the flow rate of the operating oil supplied to the turning motor 17. However, gravity that acts on the structure extending portion 9 and changes in accordance with the posture of the turning body 6 changes and influences the turning velocity. Therefore, in order to reduce the influence on the turning operation by the gravity that acts on the structure extending portion 9 and changes in accordance with the posture of the turning body 6, the flow rate correction value is set in accordance with the posture of the turning body 6 (more specifically, in accordance with the pitch angle and the roll angle) in each flow rate correction map.

For example, in the upward-turning operation, torque generated by the gravity acting on the structure extending portion 9 acts on the turning motor 17 in a direction opposite to the direction in which the turning body 6 turns. Therefore, in the upward-turning operation, the turn acceleration velocity with respect to the lever tilt amount becomes lower than that when the turning body 6 is turned on a flat land (see graphs of the flat land in a period from the time t10 to the time t11 in FIG. 12). As a result, the flow rate of the operating oil necessary to turn the turning motor 17 becomes low (see an uncorrected graph of the half-lever operation in a period from the time t10 to the time t11 in FIG. 12 and an uncorrected graph of the full-lever operation in a period from the time t10 to the time t12 in FIG. 12).

To be specific, in the upward-turning operation in a state where the inlet pressure of the turning motor 17 has not reached the relief pressure (half-lever operation), in order to keep the same turning velocity with respect to the lever tilt amount as on a flat land, the flow rate of the operating oil supplied to the turning motor 17 becomes insufficient by the same flow rate control as on a flat land. In consideration of this, as described above, in the flow rate correction map in the upward-turning operation, the flow rate correction value is set to a value greater than one. Further, a relation among the pitch angle, the roll angle, and the flow rate correction value is set as below. To be specific, the flow rate correction value is changed in accordance with the influence of the gravity that changes by the posture of the turning body 6. More specifically, as the influence of the gravity decreases by the change of the posture of the turning body 6, the flow rate correction value is made close to one. In contrast, as the gravity increases by the change of the posture of the turning body 6, the flow rate correction value is made away from one. With this, the turning velocity can be prevented from decreasing by the influence of the gravity, and the same turning velocity as on a flat land can be kept (see a corrected graph of the half-lever operation in a period from the time t10 to the time t11 in FIG. 12).

On the other hand, in the upward-turning operation in a state where the inlet pressure of the turning motor has reached the relief pressure (at the time of the acceleration), the turn torque is determined by the set pressures of the relief valves 31 and 32. Therefore, supplying the operating oil to the turning motor 17 at the same flow rate as when the turning body 6 is turned on a flat land is excessive. In consideration of this, in the flow rate correction map, the flow rate correction value is set to a value less than one. With this, the energy efficiency is prevented from being deteriorated by excessively supplying the operating oil to the turning motor 17 (see a corrected graph of the full-lever operation in a period from the time t10 to the time t12 in FIG. 12).

On the other hand, in the downward-turning operation, torque generated by the gravity acting on the structure extending portion 9 acts on the turning motor 17 in the same direction as the direction in which the turning body 6 turns. Therefore, in the downward-turning operation, the turn acceleration velocity with respect to the lever tilt amount becomes higher than that when the turning body 6 is turned on a flat land, and the operating oil is supplied to the turning motor 17 at a flow rate that is more than necessary (see the half-lever operation in a period from a time t13 to a time t15 in FIG. 12 and the full-lever operation in a period from the time t13 to a time t16 in FIG. 12). Therefore, the turning body 6 is accelerated at the time of a constant-velocity turning operation (see uncorrected graphs in a period from the time t13 to a time t14 in FIG. 12), and the insufficient deceleration occurs at the time of the deceleration-turning operation (see an uncorrected graph of the half-lever operation in a period from the time t14 to the time t15 in FIG. 12 and an uncorrected graph of the full-lever operation in a period from the time t14 to the time t16 in FIG. 12). In consideration of this, as described above, in the flow rate correction map in the downward-turning operation, the flow rate correction value is set to a value less than one. Further, in the flow rate correction map, the relation among the pitch angle, the roll angle, and the flow rate correction value is set such that: as the influence of the gravity increases during the turn, the flow rate correction value is made close to zero; and as the influence of the gravity decreases, the flow rate correction value is made close to one. With this, in the downward-turning operation, it is possible to prevent acceleration at the time of the constant-velocity turn and insufficient deceleration at the time of the deceleration-turn. Thus, the constant-velocity turning operation and the deceleration-turning operation can be performed by the same operational feeling as the turning operation on a flat land (see corrected graphs in a period from the time t13 to the time t16 in FIG. 12).

As above, in the hydraulic driving system 1B, the flow rate of the operating oil supplied to and discharged from the turning motor 17 is limited to the limiting value or less, and the excessive turning velocity and insufficient turning velocity of the turning motor 17 by the excessive acceleration and the insufficient deceleration due to the posture of the turning body 6 can be suppressed. Further, at the time of the upward-turning, the insufficient supply of the operating oil to the turning motor 17 due to the insufficient torque of the turning motor 17 by the posture of the turning body 6 can be mainly compensated, and therefore, the operational feeling can be improved. In addition, the excessive supply of the operating oil to the turning motor 17 due to the insufficient torque when the inlet pressure of the turning motor 17 has reached the relief pressure can be suppressed, and therefore, the energy efficiency can be improved.

Further, in the hydraulic driving system 1B, at the time of the upward-turning, by reducing the flow rate of the operating oil supplied to the turning motor 17, the operating oil can be preferentially supplied to the other working machine actuators 121 to 125. Therefore, without significantly reducing the velocity of the turning body 6 at the time of the upward-turning, the flow rate of the operating oil supplied to the working machine actuators 121 to 125 can be increased. Therefore, when operating the turning motor 17 and the working machine actuators 121 to 125 at the same time, the work efficiency of the working machine actuators 121 to 125 can be improved.

Other than the above, the hydraulic driving system 1B of Embodiment 3 has the same operational advantages as the hydraulic driving system 1 of Embodiment 1.

Embodiment 4

Figure 13:
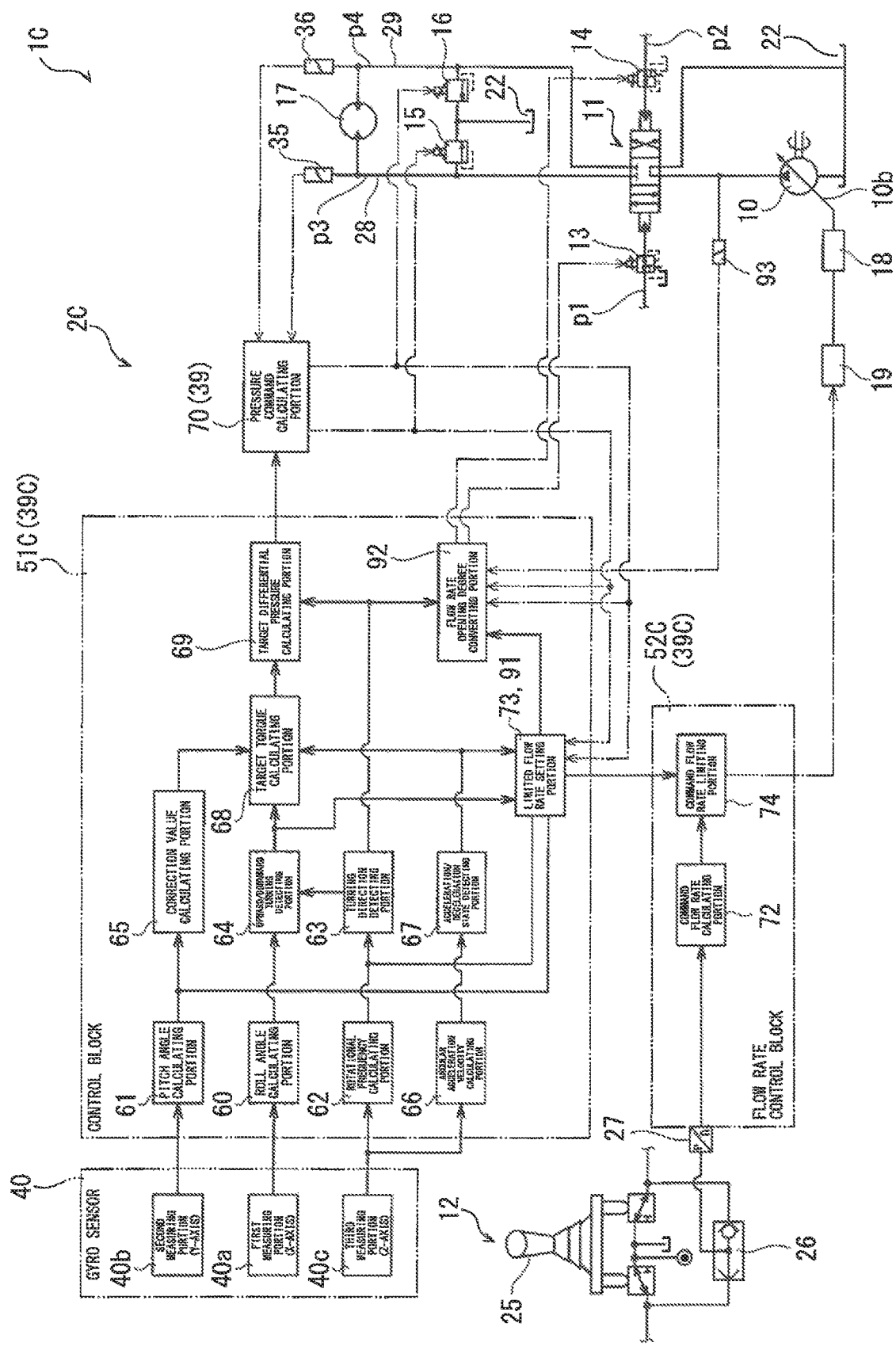
FIG. 13 is a block diagram showing control blocks constituting the controller included in the hydraulic driving system of Embodiment 4.

As shown in FIG. 13, the hydraulic driving system 1C of Embodiment 4 includes a controller unit 2C, and the controller unit 2C includes a controller 39C. The controller 39C includes a control block 51C and a flow rate control block 52C. The control block 51C has both the function of the torque control block 51 of Embodiment 1 and the function of the opening degree control block 51B of Embodiment 3. To be specific, the control block 51C includes the roll angle calculating portion 60, the pitch angle calculating portion 61, the rotational frequency calculating portion 62, the turning direction detecting portion 63, the upward/downward turning detecting portion 64, the correction value calculating portion 65, the angular acceleration velocity calculating portion 66, the acceleration/deceleration state detecting portion 67, the target torque calculating portion 68, the target differential pressure calculating portion 69, the limited flow rate setting portions 73 and 91, the limited flow rate setting portion 91, and the flow rate opening degree converting portion 92.

The controller 39C configured as above switches torque control and velocity control in accordance with the turning operation of the turning body 6. To be specific, at the time of a quick-acceleration turning operation or a quick-deceleration turning operation (i.e., at the time of the full-lever operation) in which at least one of the inlet pressure and outlet pressure applied to the turning motor 17 reaches the relief pressure, the control block 51C executes the same torque control as the torque control block 51 of Embodiment 1. With this, even when the quick acceleration or the quick deceleration occurs in the upward-turning operation, the insufficient acceleration and excessive deceleration of the turning body 6 with respect to the lever operation amount by the load torque acting on the turning motor 17 from the structure extending portion 9 can be prevented from occurring. Further, even when the quick acceleration or the quick deceleration occurs in the downward-turning operation, the excessive acceleration and insufficient deceleration of the turning body 6 with respect to the lever operation amount can be prevented from occurring.

On the other hand, at the time of a slow-acceleration turning operation, a slow-deceleration turning operation, or a constant-velocity turning operation in which each of the inlet pressure and outlet pressure of the turning motor 17 does not reach the relief pressure (for example, at the time of the half-lever operation or at the time of the operation simultaneously with the operation of the working machine actuator), the control block 51C performs the same opening degree control as the opening degree control block 51B of Embodiment 3 and performs the velocity control of the turning motor 17 in cooperation with the flow rate control block 52C. With this, in the slow-acceleration turning operation, the slow-deceleration turning operation, and the constant-velocity turning operation, the velocity of the turning motor 17 can be prevented from becoming excessive or insufficient by the load torque applied from the structure extending portion 9.

As above, according to the hydraulic driving system 1C, although the excessive velocity and the insufficient velocity at the time of the slow-acceleration turning operation, the slow-deceleration turning operation, and the constant-velocity turning operation cannot be suppressed by the torque control, they can be suppressed by the velocity control. Further, although the excessive acceleration and the insufficient acceleration at the time of the quick-acceleration turning operation cannot be suppressed by the velocity control, they can be suppressed by the torque control. Furthermore, although the excessive deceleration and the insufficient deceleration at the time of the quick-deceleration turning operation cannot be suppressed by the velocity control, they can be suppressed by the torque control. Therefore, in both the quick turning operation and the slow turning operation, the operational feeling can be prevented from being deteriorated.

Other than the above, the hydraulic driving system 1C of Embodiment 4 has the same operational advantages as the hydraulic driving system 1 of Embodiment 1.

OTHER EMBODIMENTS

In the above embodiments, the target torque calculating portion 68 calculates the corrected target torque by using the torque maps. However, the corrected target torque may be calculated by using a preset calculation formula. For example, the corrected target torque may be calculated based on the correction value and the roll angle by using a calculation formula selected in accordance with the calculated turning operation and the acceleration/deceleration state. Further, the target torque calculating portion 68 may calculate the corrected target torque by correcting an offset value, set for each of the upward-turning and the downward-turning, by the correction value. The same is true for the values calculated by using various maps.

In the hydraulic driving systems 1 and 1A to 1C of the above embodiments, the remote control valve 12 is adopted as the input device that inputs the turn command to the control valve 11. However, the above embodiments are not necessarily limited to this. For example, the input device may output a signal corresponding to the operation amount of the operating lever 25 to the controller (39 and 39A to 39C), and the controller (39 and 39A to 39C) may control the operations of the electromagnetic pressure reducing valves 13 and 14 based on the signal to control the pilot pressures p1 and p2. Further, in the hydraulic driving systems 1 and 1A to 1C of the above embodiments, the pilot oil is used to drive the spool 21 of the control valve 11. However, the above embodiments are not necessarily limited to the driving using the hydraulic pressure. For example, a ball screw may be used as a driving device configured to drive the spool 21. The position of the spool 21 may be changed by driving the ball screw with an electric motor.

In the hydraulic driving systems 1 and 1A to 1C of the above embodiments, the gyro sensor 40 detects the angular velocities of the turning body 6 around the three axes. However, the above embodiments are not necessarily limited to this. For example, the gyro sensor 40 may be configured to: detect the angular velocities of the turning body 6 around two out of the three axes (the X-axis, the Y-axis, and the Z-axis); and calculate the angular velocity around the remaining one axis from the detected two angular velocities. The gyro sensor 40 may be configured to: detect the angular acceleration velocities of the turning body 6 around two out of the three axes and the angular velocity of the turning body 6 around the remaining one axis; and calculate the angular velocities of the turning body 6 around the three axes from the three detected values. Further, as the gyro sensor 40, an acceleration sensor capable of detecting the acceleration velocities of the three axes may be used. In this case, the acceleration sensor may output the detected acceleration velocities to the controller (39 and 39A to 39C), and the controller (39 and 39A to 39C) may calculate the angular velocities around the three axes based on the three detected acceleration velocities.

In the hydraulic driving systems 1 and 1A to 1C of the above embodiments, the electromagnetic relief valves 15 and 16 are used to adjust the supply/discharge differential pressure of the supply/discharge ports 17*a* and 17*b*. However, the above embodiments are not necessarily limited to the electromagnetic relief valves. For example, a relief valve capable of changing the relief pressure at plural stages (at least two stages) in accordance with a command from the controller 39, 39A, or 39B may be used instead of the electromagnetic relief valves 15 and 16.

Figure 14:
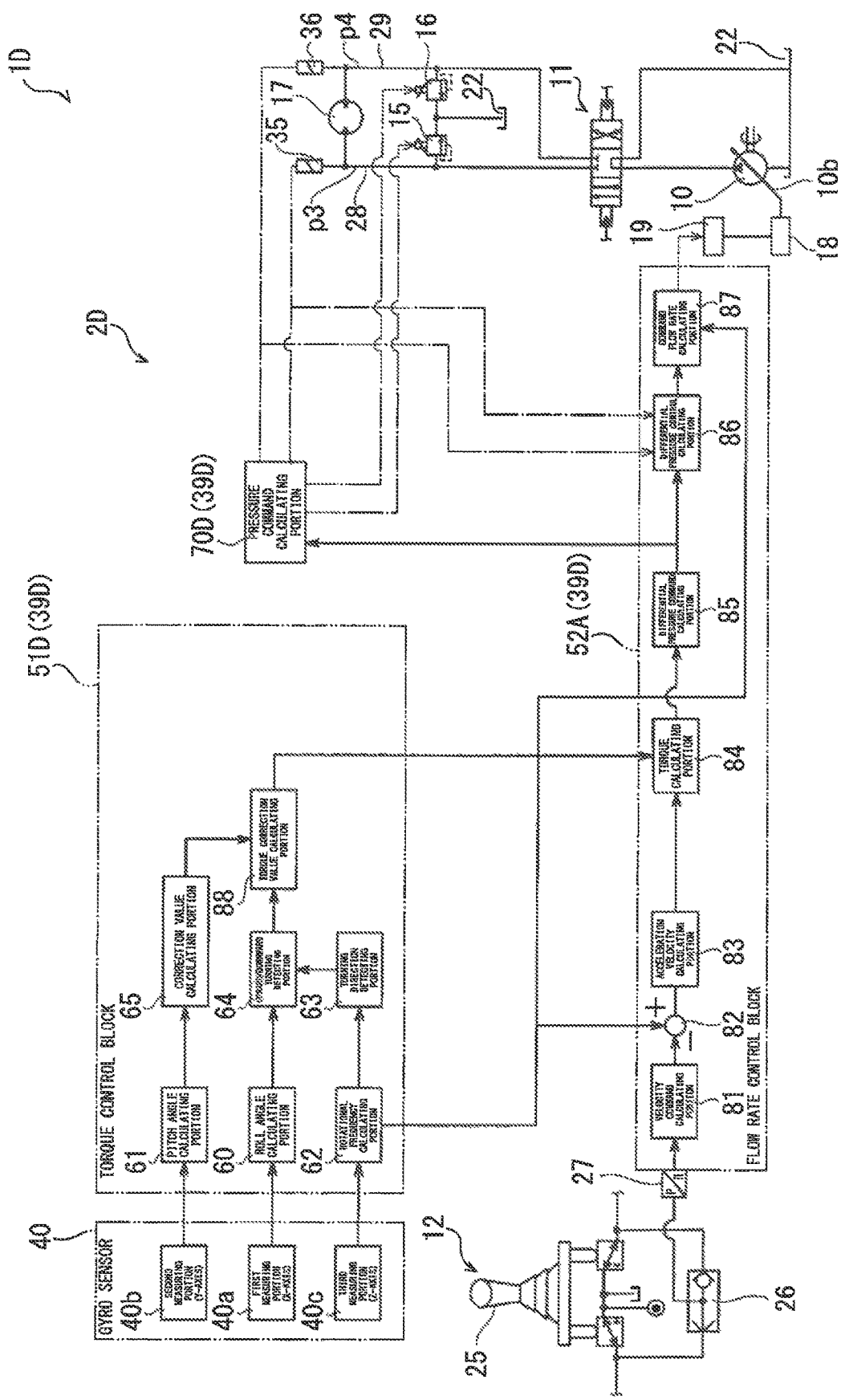
FIG. 14 is a block diagram showing control blocks constituting the controller included in the hydraulic driving system of another embodiment.

In the hydraulic driving system 1A of Embodiment 2, the torque control block 51A includes the differential pressure correction value calculating portion 89. However, as shown in FIG. 14, in the hydraulic driving system 1D, a controller 39D of a controller unit 2D does not have to include the differential pressure correction value calculating portion 89. In this case, the torque correction value calculating portion 88 of the torque control block 51D calculates the torque correction value. Further, the torque calculating portion 84 of the flow rate control block 52D calculates the target torque of the turning motor 17 based on the target turn acceleration velocity and corrects the target torque based on the torque correction value calculated by the torque correction value calculating portion 88. Based on the target supply/discharge differential pressure calculated by the differential pressure command calculating portion 85, the pressure command calculating portion 70D outputs the pressure commands to the electromagnetic relief valves 15 and 16 to change the set pressures of the electromagnetic relief valves 15 and 16. The hydraulic driving system configured as above has the same operational advantages as the hydraulic driving system 1A of Embodiment 2.

In the hydraulic driving system 1B of Embodiment 3, by directly controlling the position of the spool 21 of the control valve 11, the flow rate of the operating oil supplied to and discharged from the turning motor 17 is adjusted, and thus, the rotation velocity of the turning motor 17 is controlled. However, the above embodiment is not necessarily limited to the adjustment of the flow rate of the operating oil supplied to and discharged from the turning motor 17 by directly controlling the spool 21. For example, the flow rate of the operating oil supplied to the turning motor 17 may be adjusted by: providing, in addition to the control valve 11, another flow control valve at a meter-in side of the turning motor 17; and controlling the opening degree of the flow control valve.

Figure 15:
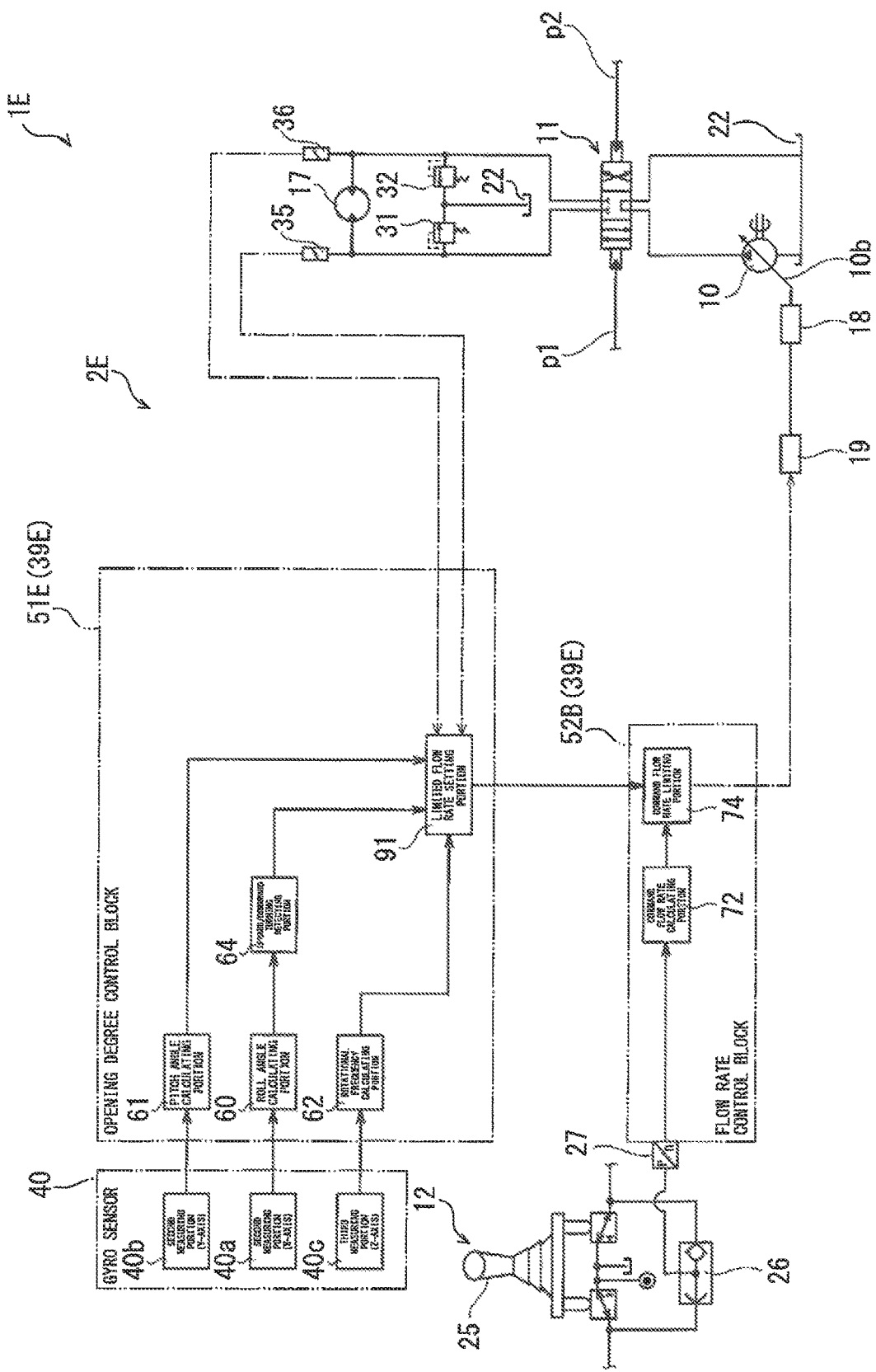
FIG. 15 is a block diagram showing control blocks constituting the controller included in the hydraulic driving system of yet another embodiment.

Further, in the hydraulic driving system 1B of Embodiment 3, the opening degree control block 51B includes the flow rate opening degree converting portion 92. However, as shown in FIG. 15, in the hydraulic driving system 1E, an opening degree control block 51E of a controller 39E of a controller unit 2E does not have to include the flow rate opening degree converting portion 92. In this case, the hydraulic driving system 1E performs the same operations as the hydraulic driving system 1B by adjusting the ejection amount of the hydraulic pump 10 instead of by controlling the operations of the electromagnetic pressure reducing valves 13 and 14 to adjust the flow rate of the operating oil supplied to and discharged from the turning motor 17 as in the hydraulic driving system 1B.

To be specific, as with the hydraulic driving system 1B, the limited flow rate setting portion 91 sets the flow rate correction value based on the flow rate correction map and calculates the limiting value. The command flow rate limiting portion 74 limits the command flow rate to the limiting value or less and outputs the flow rate command corresponding to the limited command flow rate to the pressure reducing valve 19. With this, the ejection flow rate of the hydraulic pump 10 is limited to the limiting value or less. For example, in the downward-turning operation, the limited flow rate setting portion 91 makes the limiting value of the ejection flow rate small to suppress the ejection flow rate of the pump. With this, in the downward-turning operation, the operating oil can be prevented from being excessively supplied to the turning motor 17. To be specific, at the time of the downward-turning operation, the turning body 6 can be prevented from being excessively accelerated as compared to a case where the turning body 6 is turned on a flat land, and the operational feeling can be improved.

On the other hand, in the upward-turning operation, the limited flow rate setting portion 91 makes the limiting value of the ejection flow rate large to increase the ejection flow rate of the pump. With this, at the time of the upward-turning, a larger amount of operating oil can be supplied from the hydraulic pump 10 to the turning motor 17. To be specific, at the time of the upward-turning operation, the turning operation can be prevented from excessively slowing as compared to a case where the turning body 6 is turned on a flat land, and the operational feeling can be improved.

Further, by detecting the inlet pressure of the turning motor 17 by the hydraulic pressure sensors 35 and 36, the limited flow rate setting portion 91 of the controller 39 may determine whether or not the inlet pressure of the turning motor 17 has reached the relief pressure. In this case, when it is determined that: the inlet pressure of the turning motor 17 has reached the relief pressure; and the turning body 6 performs the upward-turning operation and is in the acceleration state, the limited flow rate setting portion 91 makes the limiting value of the ejection flow rate small. With this, the flow rate of the operating oil supplied to the turning motor 17 can be reduced, and therefore, the operating oil excessively supplied can be prevented from being directly discharged from the relief valves 31 and 32 (see FIG. 3). To be specific, the flow rate of the operating oil ejected from the hydraulic pump 10 and directly discharged to the tank 22 through the relief valves 31 and 32 can be reduced, and thus, the energy efficiency can be improved. As with Embodiment 3, the pressure sensor 93 (see FIG. 11) for the pump pressure may be used to determine whether or not the inlet pressure of the turning motor 17 has reached the relief pressure.

Each of the hydraulic driving systems 1 and 1A to 1E of the above embodiments does not have to execute all the control operations executed in each embodiment, and the flow rate control and/or the pressure control may be omitted according to need. Further, the control operations executed in the hydraulic driving systems 1 and 1A to 1E may be combined with one another. For example, both the flow rate control and the pressure control may be executed.

The foregoing has explained a case where each of the hydraulic driving systems 1 and 1A to 1E of the above embodiments is mounted on the hydraulic excavator 3. However, the above embodiments are not limited to the hydraulic excavator 3, and each of the hydraulic driving systems 1 and 1A to 1E is only required to be mounted on a construction machine including an actuator, such as the turning motor 17. Further, each of the controllers 39 and 39A to 39E does not necessarily have to have the above-described function of controlling the flow rate of the hydraulic pump 10 and the torque of the turning motor 17 based on the posture of the turning body 6 and may have a function of simply detecting the turning velocity of the turning body 6 and control the flow rate of the hydraulic pump 10 and the torque of the turning motor 17.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

REFERENCE SIGNS LIST 1, 1A to 1E hydraulic driving system (liquid-pressure driving system)
2, 2A to 2E controller unit
3 hydraulic excavator (working machine, turning working machine)
9 structure extending portion (turning body structural portion)
10 hydraulic pump
11 control valve (direction control valve)
15, 16 electromagnetic relief valve (relief valve)
17 turning motor (liquid-pressure motor)
18 regulator (flow rate control device)
25 operating lever (operating element)
39, 39A to 39E controller 40 gyro sensor (posture detector, rotation velocity detector)
121 to 125 actuator

The invention claimed is:

1. A liquid-pressure driving system for use in a working machine configured to supply an operating liquid to an actuator to move a structural body by the actuator, the liquid-pressure driving system comprising:
   a controller unit comprising:
      a gyro sensor configured to output a signal corresponding to an operation velocity of the structural body; and
      a controller configured to control a flow rate of the operating liquid supplied to the actuator, based on the signal output from the gyro sensor and corresponding to the operation velocity of the structural body, wherein:
   the controller is attached to the structural body;
   the gyro sensor is incorporated in the controller;
   the structural body is a turning body;
   the actuator is a liquid-pressure motor configured to turn the turning body;
   the gyro sensor is configured to output a signal corresponding to a turning;
   the turning body includes a structure extending portion extending in a front-rear direction;
   the gyro sensor is a sensor configured to detect an angular velocity of the turning body and to output signals corresponding to respective angular velocities around first to third axes of the turning body;
   the controller is attached to the turning body such that the first axis coincides with the front-rear direction of the turning body, and the second axis coincides with a left-right direction of the turning body;
   a variable displacement liquid-pressure pump configured to eject the operating liquid supplied to the liquid-pressure motor, the liquid-pressure pump being capable of changing an ejection amount;
   a flow rate control device configured to control the ejection amount of the liquid-pressure pump in accordance with a pump flow rate command input to the flow rate control device, wherein:
   the gyro sensor outputs a first signal and a second signal, the first signal being a signal corresponding to the angular velocity around the first axis of the turning body, the second signal being a signal corresponding to the angular velocity around the third axis of the turning body; and
   the controller calculates a command flow rate corresponding to an operation amount of an operating element, detects a roll angle of the turning body based on the first signal output from the gyro sensor, detects a turning direction of the turning body based on the second signal output from the gyro sensor, calculates a limiting value of the command flow rate in accordance with the detected roll angle and the detected turning direction, and outputs to the flow rate control device the pump flow rate command generated by limiting the command flow rate to the limiting value or less; and
   a direction control valve configured to switch a rotation direction of the liquid-pressure motor by switching a flow direction of the operating liquid in accordance with an operation direction in which the operating element is operated, the operating liquid being supplied from the liquid-pressure pump to the liquid-pressure motor, wherein:
   the direction control valve controls in accordance with the operation amount of the operating element the flow rate of the operating liquid supplied to and discharged from the liquid-pressure motor; and
   the controller detects the roll angle based on the first signal output from the gyro sensor, detects a rotation velocity of the liquid-pressure motor and the rotation direction of the liquid-pressure motor based on the second signal output from the gyro sensor, and controls an operation of the direction control valve such that the flow rate of the operating liquid supplied to and discharged from the liquid-pressure motor is limited in accordance with the detected roll angle, the detected rotation velocity, and the detected rotation direction.

2. The liquid-pressure driving system according to claim 1, further comprising:
   a relief valve configured to adjust a liquid pressure of the operating liquid supplied to the liquid-pressure motor, by releasing the operating liquid at a set pressure corresponding to a torque command input to the relief valve, wherein:
   the controller adjusts the set pressure of the relief valve by outputting to the relief valve the torque command corresponding to the detected roll angle and the detected rotation direction.

3. A liquid-pressure driving system configured to supply and discharge an operating liquid to and from a liquid-pressure motor of a working machine, the liquid-pressure motor being configured to operate at a rotational frequency corresponding to a flow rate of the operating liquid supplied to and discharged from the liquid-pressure motor,
   the liquid-pressure driving system comprising:
      a liquid-pressure pump configured to eject the operating liquid supplied to the liquid-pressure motor;
      a direction control valve configured to switch a rotation direction of the liquid-pressure motor by switching a flow direction of the operating liquid, supplied to and discharged from the liquid-pressure motor, in accordance with an operation direction in which an operating element is operated, and further configured to control the flow rate of the operating liquid discharged, in accordance with an operation amount of the operating element;
      a posture detector configured to output a signal corresponding to a posture of a structural body of the working machine;
      a rotation velocity detector configured to output a signal corresponding to a rotation direction and rotation velocity of the liquid-pressure motor; and
      a controller configured to detect the rotation velocity of the liquid-pressure motor based on the signal output from the rotation velocity detector, and further configured to control an operation of the direction control valve such that the flow rate of the operating liquid supplied to and discharged from the liquid-pressure motor is limited to not more than an upper limit value corresponding to the rotation velocity, wherein
      the controller detects the posture of the structural body based on the signal output from the posture detector, detects the rotation direction of the liquid-pressure motor based on the signal output from the rotation velocity detector, and corrects the upper limit value based on the detected posture and the detected rotation direction.

4. The liquid-pressure driving system according to claim 3, further comprising a relief valve configured to adjust a pressure difference between the operating liquid supplied to the liquid-pressure motor and the operating liquid discharged from the liquid-pressure motor, by releasing the operating liquid, supplied to and discharged from the liquid-pressure motor, at a set pressure corresponding to a torque command input to the relief valve, wherein:

the controller detects whether or not each of a detected inlet pressure and detected outlet pressure of the liquid-pressure motor has reached a predetermined set pressure;

when each of the inlet pressure and outlet pressure of the liquid-pressure motor has not reached the set pressure, the controller corrects the upper limit value based on the detected posture and the detected rotation direction; and when at least one of the inlet pressure and outlet pressure of the liquid-pressure motor has reached the set pressure, the controller adjusts the pressure difference by outputting to the relief valve the torque command corresponding to the detected posture and the detected rotation direction.

5. The liquid-pressure driving system according to claim 3, wherein:

the working machine is a turning working machine including a turning body;

the liquid-pressure motor is a turning motor configured to turn the turning body;

the turning body is provided with a turning body structural portion whose load torque applied to the turning motor changes in accordance with a posture of the turning body;

the posture detector outputs a signal corresponding to a roll angle indicating the posture of the turning body;

the rotation velocity detector outputs a signal corresponding to a turning direction of the turning body, the turning direction corresponding to a rotation direction of the turning motor;

the controller detects based on the detected roll angle and the detected turning direction whether an operation of the turning motor is an upward-turning operation in which the turning body structural portion moves upward or a downward-turning operation in which the turning body structural portion moves downward; and when the detected operation is the downward-turning operation, the controller corrects the upper limit value of the flow rate of the operating liquid supplied to and discharged from the turning motor such that the upper limit value becomes small.

6. The liquid-pressure driving system according to claim 5, further comprising a working machine actuator different from the turning motor, wherein:

the working machine actuator operates by the operating oil ejected from the liquid-pressure pump; and when the detected turning operation is the upward-turning operation, the controller corrects the upper limit value of the flow rate of the operating liquid supplied to and discharged from the turning motor such that the upper limit value becomes small.

7. The liquid-pressure driving system according to claim 5, wherein:

the posture detector outputs a signal corresponding to a pitch angle indicating the posture of the turning body; and when the detected operation is the downward-turning operation, the controller calculates based on the roll angle the flow rate of the operating liquid supplied to and discharged from the turning motor and corrects in accordance with the detected pitch angle the flow rate of the operating liquid supplied to and discharged from the turning motor.

8. The liquid-pressure driving system according to claim 6, wherein:

the posture detector outputs a signal corresponding to a pitch angle indicating the posture of the turning body; and when the detected operation is the downward-turning operation, the controller calculates based on the roll angle the flow rate of the operating liquid supplied to and discharged from the turning motor and corrects in accordance with the detected pitch angle the flow rate of the operating liquid supplied to and discharged from the turning motor.

9. A liquid-pressure driving system configured to supply and discharge an operating liquid to and from a liquid-pressure motor configured to move a structural body of a working machine by operating with torque corresponding to a pressure difference between the operating liquid supplied to the liquid-pressure motor and the operating liquid discharged from the liquid-pressure motor, the liquid-pressure driving system comprising:

a liquid-pressure pump configured to eject the operating liquid supplied to the liquid-pressure motor;

a direction switching valve configured to switch a rotation direction of the liquid-pressure motor by switching a flow direction of the operating liquid in accordance with an operation direction in which an operating element is operated, the operating liquid being supplied from the liquid-pressure pump to the liquid-pressure motor;

a relief valve configured to adjust a pressure difference between the operating liquid supplied to the liquid-pressure motor and the operating liquid discharged from the liquid-pressure motor, by releasing the operating liquid, supplied to and discharged from the liquid-pressure motor, at a set pressure corresponding to a torque command input to the relief valve;

a posture detector configured to output a signal corresponding to a posture of the structural body;

a rotation direction detector configured to output a signal corresponding to the rotation direction; and a controller configured to detect the posture based on the signal output from the posture detector, detect the rotation direction based on the signal output from the rotation direction detector, and adjust the pressure difference by outputting to the relief valve the torque command corresponding to the detected posture and the detected rotation direction.

10. The liquid-pressure driving system according to claim 9, wherein:

the working machine is a turning working machine including a turning body that is the structural body;

the liquid-pressure motor is a turning motor configured to turn the turning body;

the turning body is provided with a turning body structural portion whose load torque applied to the turning motor changes in accordance with a posture of the turning body;

the posture detector outputs a signal corresponding to a roll angle of the turning body, the roll angle indicating the posture of the turning body;

the rotation direction detector outputs a signal corresponding to a turning direction of the turning body and a rotation velocity of the liquid-pressure motor, the turning direction corresponding to the rotation direction;

the controller detects based on the detected roll angle and the detected turning direction whether an operation of the turning motor is an upward-turning operation in which the turning body structural portion moves upward or a downward-turning operation in which the turning body structural portion moves downward;

the controller detects based on the signal output from the rotation direction detector whether a state of the turning body is an acceleration state or a deceleration state;

when the detected operation is the upward-turning operation, and the detected state is the acceleration state, the controller adjusts the pressure difference such that turn torque of the turning motor becomes larger than that when the turning operation is performed on a flat land, and the state of the turning body is the acceleration state; and when the detected operation is the downward-turning operation, and the detected state is the acceleration state, the controller adjusts the pressure difference such that the turn torque of the turning motor becomes smaller that when the turning operation is performed on a flat land, and the state of the turning body is the acceleration state.

11. The liquid-pressure driving system according to claim 9, wherein:

the working machine is a turning working machine including a turning body that is the structural body;

the liquid-pressure motor is a turning motor configured to turn the turning body;

the turning body is provided with a turning body structural portion whose load torque applied to the turning motor changes in accordance with a posture of the turning body;

the posture detector outputs a signal corresponding to a roll angle of the turning body, the roll angle indicating the posture of the turning body;

the rotation direction detector outputs a signal corresponding to a turning direction of the turning body and a rotation velocity of the liquid-pressure motor, the turning direction corresponding to the rotation direction;

the controller detects based on the detected roll angle and the detected turning direction whether an operation of the turning motor is an upward-turning operation in which the turning body structural portion moves upward or a downward-turning operation in which the turning body structural portion moves downward;

the controller detects based on the signal output from the rotation direction detector whether a state of the turning body is an acceleration state or a deceleration state;

when the detected operation is the upward-turning operation, and the detected state is the deceleration state, the controller adjusts the pressure difference such that brake torque of the turning motor becomes smaller than that when the turning operation is performed on a flat land, and the state of the tuning body is the deceleration state; and when the detected operation is the downward-turning operation, and the detected state is the deceleration state, the controller adjusts the pressure difference such that the brake torque of the turning motor becomes larger than that when the turning operation is performed on a flat land, and the state of the tuning body is the deceleration state.

12. The liquid-pressure driving system according to claim 10, wherein:

the posture detector outputs a signal corresponding to a pitch angle indicating the posture of the turning body; and when the detected operation is the upward-turning operation, the controller corrects the pressure difference in accordance with the detected pitch angle.

13. The liquid-pressure driving system according to claim 12, further comprising a gyro sensor including the posture detector and the rotation direction detector, wherein the gyro sensor outputs signals corresponding to the roll angle of the turning body, the pitch angle of the turning body, and a turning velocity of the turning body, respectively.

14. The liquid-pressure driving system according to claim 11, wherein:

the posture detector outputs a signal corresponding to a pitch angle indicating the posture of the turning body; and when the detected operation is the upward-turning operation, the controller corrects the pressure difference in accordance with the detected pitch angle.

15. The liquid-pressure driving system according to claim 14, further comprising a gyro sensor including the posture detector and the rotation direction detector, wherein the gyro sensor outputs signals corresponding to the roll angle of the turning body, the pitch angle of the turning body, and a turning velocity of the turning body, respectively.

* * * * *